(12) United States Patent
Fujita et al.

(10) Patent No.: US 7,409,467 B2
(45) Date of Patent: Aug. 5, 2008

(54) DATA TRANSFER CONTROL SYSTEM, ELECTRONIC INSTRUMENT, AND DATA TRANSFER CONTROL METHOD

(75) Inventors: Shinichiro Fujita, Kitakyushu (JP); Hiroyuki Kanai, Shiojiri (JP); Koji Nakao, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 630 days.

(21) Appl. No.: 10/781,721

(22) Filed: Feb. 20, 2004

(65) Prior Publication Data

US 2004/0230734 A1    Nov. 18, 2004

(30) Foreign Application Priority Data

Feb. 25, 2003  (JP)  ............. 2003-047365

(51) Int. Cl.
*G06F 3/00*  (2006.01)

(52) U.S. Cl. ............. 710/5; 710/22; 710/300

(58) Field of Classification Search ........ None
See application file for complete search history.

(56) References Cited

U.S. PATENT DOCUMENTS 5,758,075 A * 5/1998 Graziano et al. ......... 709/250
6,636,922 B1 * 10/2003 Bastiani et al. ......... 710/305
2001/0042141 A1 * 11/2001 Matsunaga et al. ......... 710/1

FOREIGN PATENT DOCUMENTS

| JP | 01106254 | * | 4/1989 |
| JP | 2001-177536 | | 6/2001 |
| JP | 2001-177537 | | 6/2001 |

OTHER PUBLICATIONS

U.S. Appl. No. 10/625,748, filed Jul. 24, 2003, Fujita et al.

* cited by examiner

*Primary Examiner*—Eron J Sorrell
(74) *Attorney, Agent, or Firm*—Oliff & Berridge, PLC

(57) ABSTRACT

The system stores a storage address ADK1 of a page table element PEK1 that was being processed when a bus reset occurred, of page table elements of a page table specified by an ORB1. The system then reads out a storage address ADK2 of a page table element PEK2 having the same element number as PEK1, of page table elements of an ORB2 after the bus reset occurs, and restarts data transfer when ADK1 and ADK2 are the same. When the page table is absent, addresses DAD1 and DAD2 that are specified directly by the ORB1 and the ORB2 are compared. When data transfer is not be restarted but a command CMD1 of the ORB1 has already been issued to a device, the CMD1 is aborted.

11 Claims, 25 Drawing Sheets

FIG. 5A
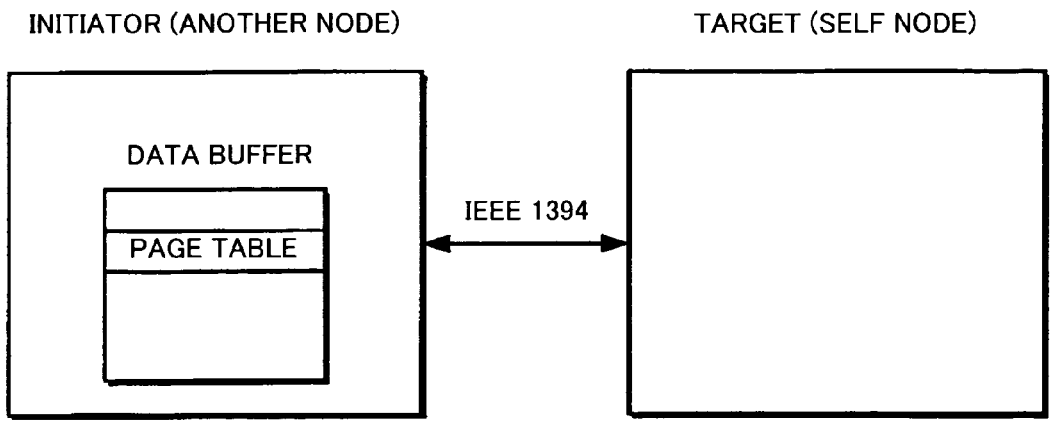
FIG. 5B  WHEN PAGE TABLE IS PRESENT
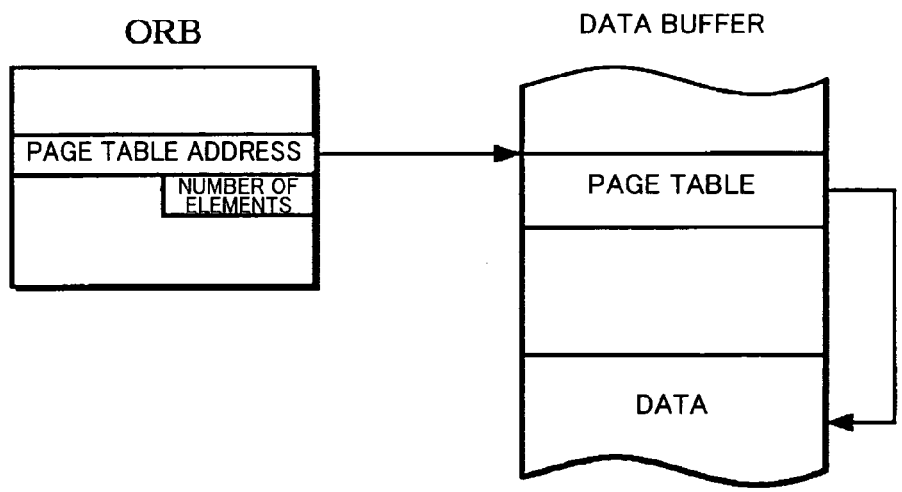
FIG. 5C  WHEN PAGE TABLE IS ABSENT
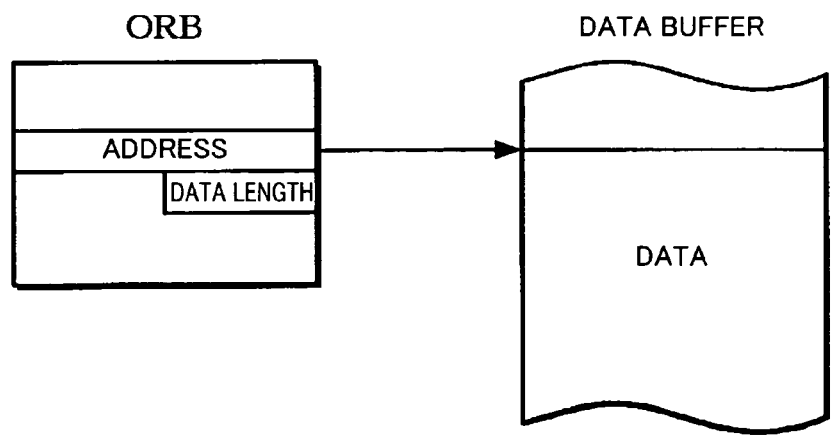

FIG. 14
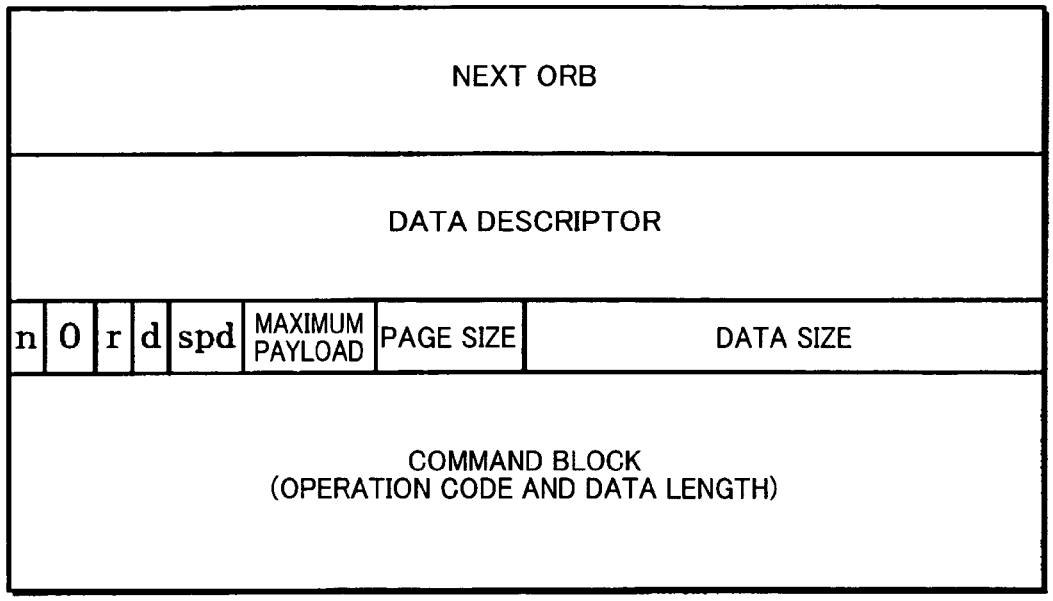
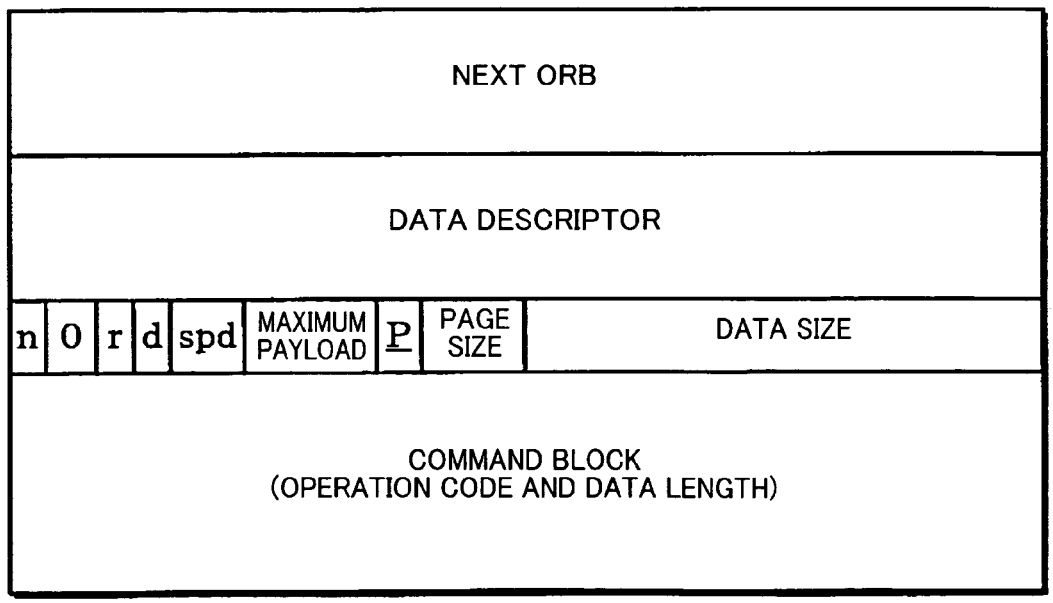

FIG. 22A  PIO READ (DEVICE --> DATA TRANSFER CONTROL SYSTEM --> PC)
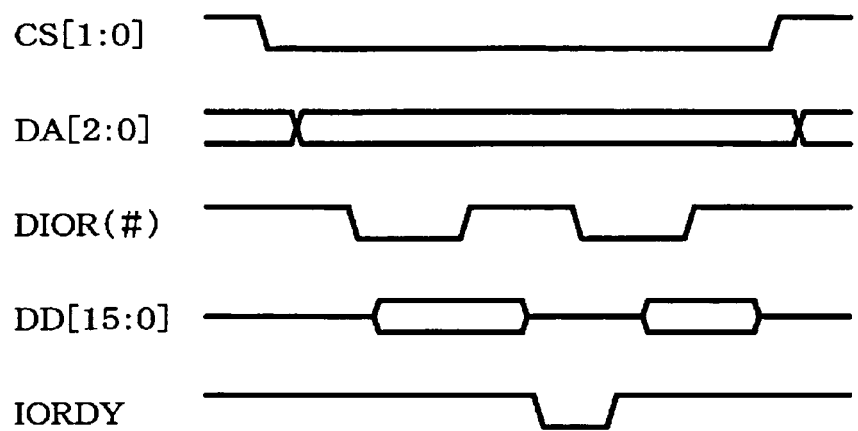
FIG. 22B  PIO WRITE (PC --> DATA TRANSFER CONTROL SYSTEM --> DEVICE)
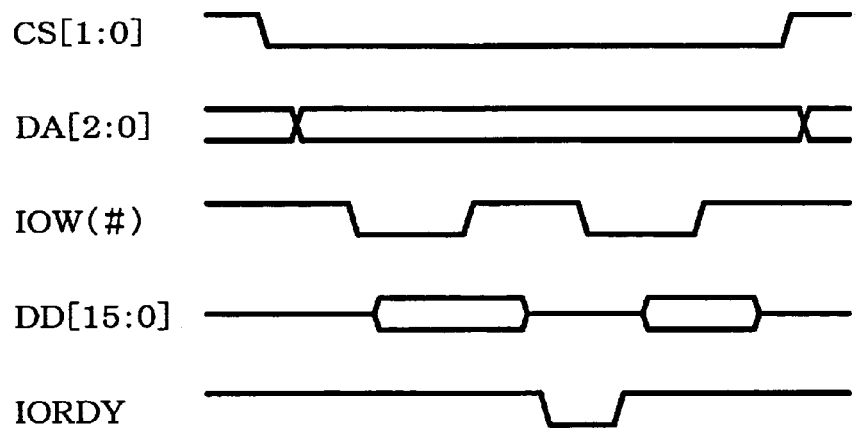

FIG. 23A DMA READ (DEVICE --> DATA TRANSFER CONTROL SYSTEM --> PC)
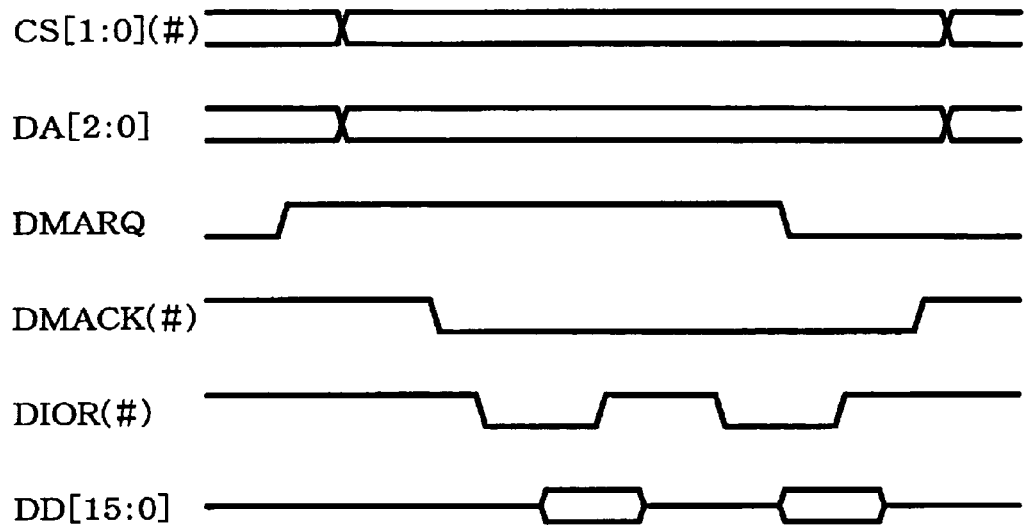
FIG. 23B DMA WRITE (PC --> DATA TRANSFER CONTROL SYSTEM --> DEVICE)
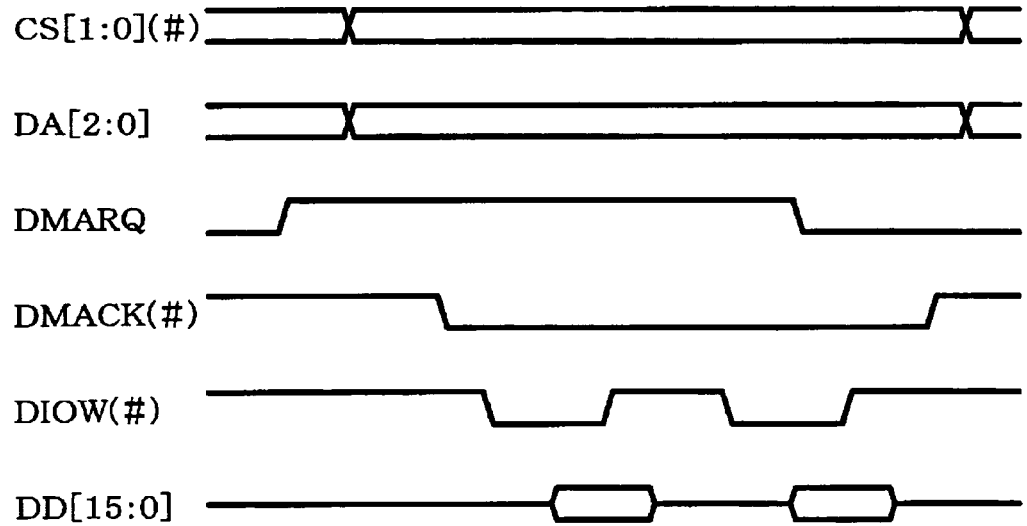

ULTRA-DMA READ (DEVICE --> DATA TRANSFER CONTROL SYSTEM --> PC)

ULTRA-DMA WRITE (PC --> DATA TRANSFER CONTROL SYSTEM --> DEVICE)

US 7,409,467 B2

DATA TRANSFER CONTROL SYSTEM, ELECTRONIC INSTRUMENT, AND DATA TRANSFER CONTROL METHOD

Japanese Patent Application No. 2003-47365, filed on Feb. 25, 2003, is hereby incorporated by reference in its entirety.

BACKGROUND OF THE INVENTION

The present invention relates to a data transfer control system, an electronic instrument and a data transfer control method.

An interface standard called IEEE 1394 has recently attracted a great deal of attention. Under this IEEE 1394, a bus reset occurs if an electronic instrument is connected anew to the bus, an electronic instrument is removed from the bus, or the number of nodes connected to the bus changes. When a bus reset occurs, the node topology information is cleared and then the topology information is automatically reset. Since this makes it possible to use hot-plugging of the cable in a hot state, it enables general users to freely plug in and remove the cable to the electronic instrument, in the same way as ordinary domestic electric products such as VCRs.

However, various problems are caused by the occurrence of such bus resets. Examples of prior-art techniques of solving these problems are disclosed in Japanese Patent Application Laid-Open No. 2001-177537 and Japanese Patent Application Laid-Open No. 2001-177536.

Even the above-mentioned prior-art techniques, however, might not be able to guarantee normal operation during a bus reset, depending on the specifications of operating systems (OSs) and application programs that will be on the market in the future.

If a direct memory access (DMA) transfer is started by the execution of a command to a hard disk drive (generally speaking: a storage device; more generally speaking: a device) and subsequently a bus reset occurs during the DMA transfer, by way of example, problems might occur, such as a hang-up of the hard disk drive.

BRIEF SUMMARY OF THE INVENTION

A data transfer control system for data transfer through a bus according to one aspect of the present invention includes:

an address storage section which stores a first address, the first address being stored in a page table element that is being processed at a point at which a bus reset occurs among page table elements of a page table specified by a first command packet transferred through a first bus;

an address comparison section which reads out a second address and compares the stored first address and the read-out second address, the second address being stored in a page table element having the same element number as the page table element in which the first address is stored among page table elements of a page table specified by a second command packet, when the second command packet is transferred through the first bus after the bus reset occurs; and a transfer restart section which restarts data transfer from the page table element that is being processed at the point at which the bus reset occurs, when it has been determined that the first address and the second address are the same.

A data transfer control system for data transfer through a bus according to another aspect of the present invention includes:

a command storage section which stores a content of a first command packet transferred through a first bus;

an address storage section which stores a first direct address which is specified directly by the first command packet, when a page table is absent;

a command comparison section which compares a content of the first command packet and a content of a second command packet, when the second command packet is transferred through the first bus after a bus reset occurs;

an address comparison section which compares a first direct address which is specified directly by the first command packet and a second direct address which is specified directly by the second command packet, when the page table is absent; and a transfer restart section which restarts data transfer as a resumption of data transfer at a point at which the bus reset occurs on condition that it has been determined that the contents of the first and second command packets are the same and also that the first and second direct addresses are the same when the page table is absent, and restarts data transfer as a resumption of data transfer at the point at which the bus reset occurred on condition that it has been determined that the contents of the first and second command packets are the same when the page table is present.

BRIEF DESCRIPTION OF THE SEVERAL VIEWS OF THE DRAWING

FIGS. 5A, 5B, and 5C are illustrative of page tables;

FIG. 14 is illustrative of ORB comparison processing;

FIGS. 22A and 22B show examples of signal waveforms during PIO transfer;

FIGS. 23A and 23B show examples of signal waveforms during DMA transfer;

DETAILED DESCRIPTION OF THE EMBODIMENT

Note that the embodiments described hereunder do not in any way limit the scope of the invention defined by the claims laid out herein. Note also that all of the elements of these embodiments should not be taken as essential requirements to the means of the present invention.

1. IEEE 1394 and SBP-2

1.1 Layer Configuration

A protocol called the Serial Bus Protocol-2 (SBP-2) has been proposed as an upper-level protocol including some of the functions of the transaction layer under IEEE 1394. This SBP-2 (generally speaking: SBP) has been proposed in order to enable the use of the SCSI (SPC-2) command set on the IEEE 1394 protocol. With minimum changes to the command set used in electronic instruments that conform to the existing SCSI standards, use of this SBP-2 ensures that electronic instruments that conform to IEEE 1394 can also be used. This therefore enables a simplification of the design and development of electronic instruments.

Figure 1:
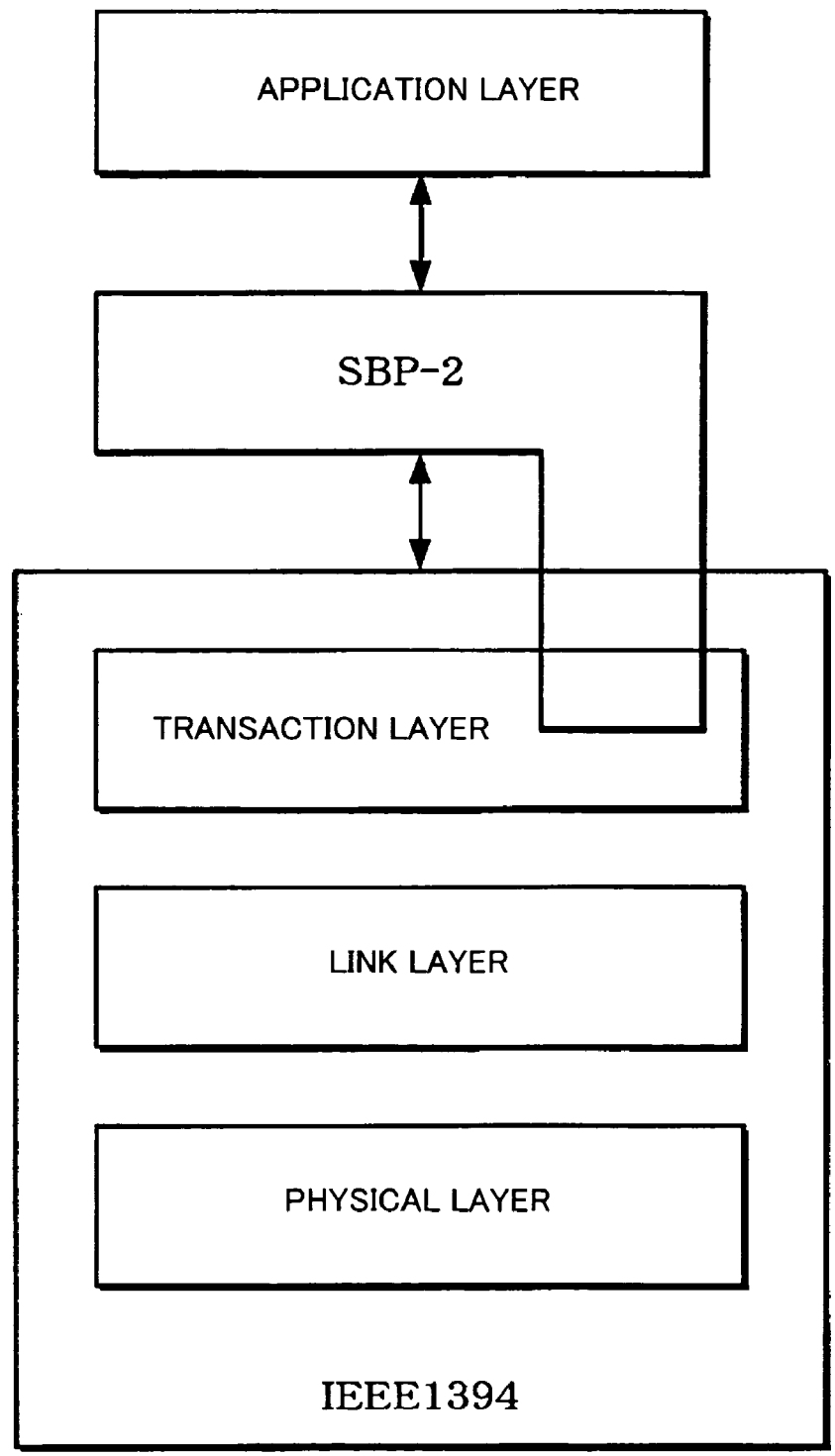
FIG. 1 is illustrative of the IEEE 1394 SBP-2 layer structure.

The IEEE 1394 SBP-2 layer structure (protocol stack) is shown simplified in FIG. 1. The protocol for IEEE 1394 (such as IEEE 1394-1995, P1394a, and P1394b) is configured of a transaction layer, a link layer, and a physical layer.

The transaction layer provides an interface (services) in transaction units for upper layers and executes transactions such as read transactions, write transactions, and lock transactions through an interface provided by the link layer below it. In this case, a read transaction causes the transfer of data from a responding node to a requesting node. A write transaction causes the transfer of data from a requesting node to a responding node. A lock transaction causes the transfer of data from a requesting node to a responding node and returns that data, after it has been processed by the responding node, to the requesting node.

The link layer provides control such as cycle control for addressing, data checking, data framing for packet transfers, and isochronous transfer. The physical layer provides conversions to electrical signals of logical symbols used by the link layer, bus arbitration, and a physical interface for the bus. The SBP-2 layer provides an upper-level protocol that includes some of the functions of the transaction layer under IEEE 1394 (generally speaking: a first interface standard), as shown in FIG. 1.

1.2 SBP-2 Processing

Figure 2:
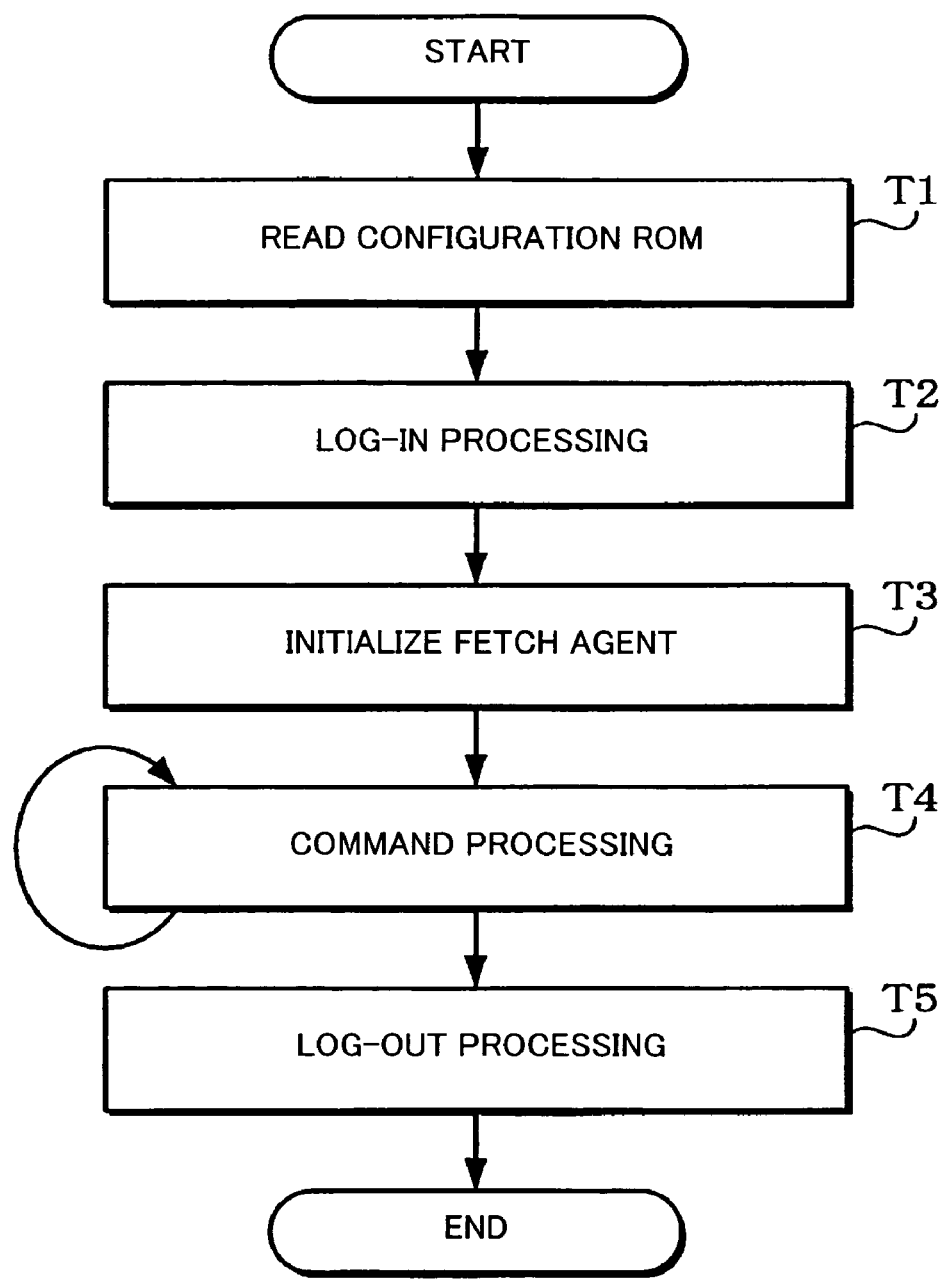
FIG. 2 is illustrative of outline of the SBP-2 processing.

A flowchart of the entire processing of the SBP-2 (generally speaking: an upper-level first protocol for a first interface standard) is shown in FIG. 2.

As shown in FIG. 2, SBP-2 ensures that configuration ROM information for confirming the connected device is read first (step T1).

Next, the initiator (such as a personal computer) is asked to log in to acquire the access right (request start permission, or the right to use the bus) with respect to the target (such as a storage device) (step T2). More specifically, log-in is performed by using a log-in operation request block (ORB) created by the initiator.

The fetch agent is then initialized (step T3). A command block ORB (normal command ORB) is then used to perform command processing, and finally a log-out ORB is used for log-out processing (step T5).

Figure 3:
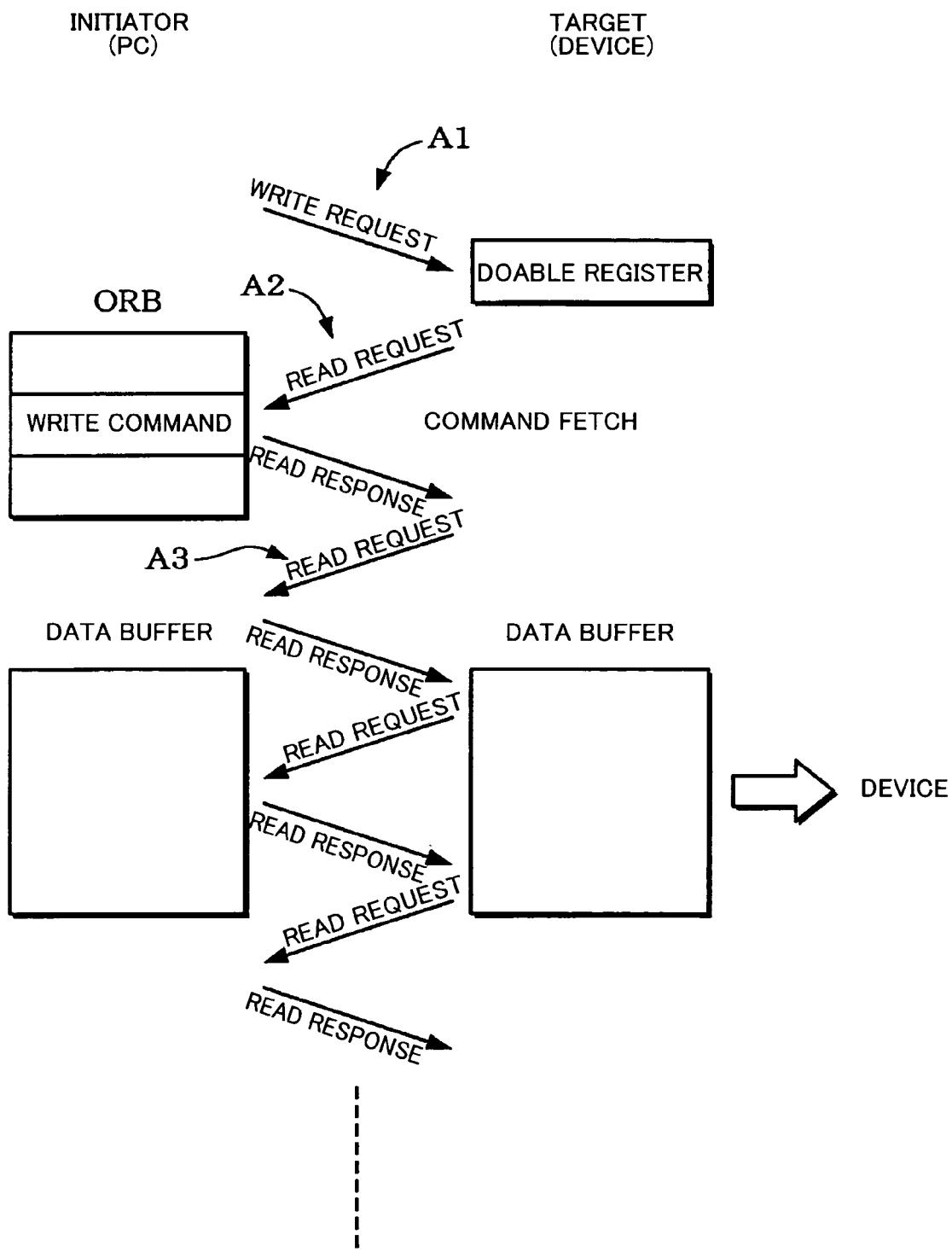
FIG. 3 is illustrative of data transfer from the initiator to the target.

During the command processing of step T4 in this case, the initiator transfers a write request packet (issues a write request transaction) and rings the target doorbell register, as shown at A1 in FIG. 3. When that happens, the target transfers a read request packet and the initiator returns the corresponding read response packet, as shown at A2. This causes the fetching of the ORB (command block ORB) created by the initiator into the data buffer (packet buffer) of the target. The target analyzes the command included within the thus-fetched ORB.

If the command included within the ORB is a SCSI write command, the target transfers the read request packet to the initiator and the initiator returns the corresponding read response packet as shown by A3 in FIG. 3. This causes the transfer of data that was stored in the data buffer of the initiator to the target. If the target is a storage device, by way of example, the thus-transferred data is written to the storage device.

Figure 4:
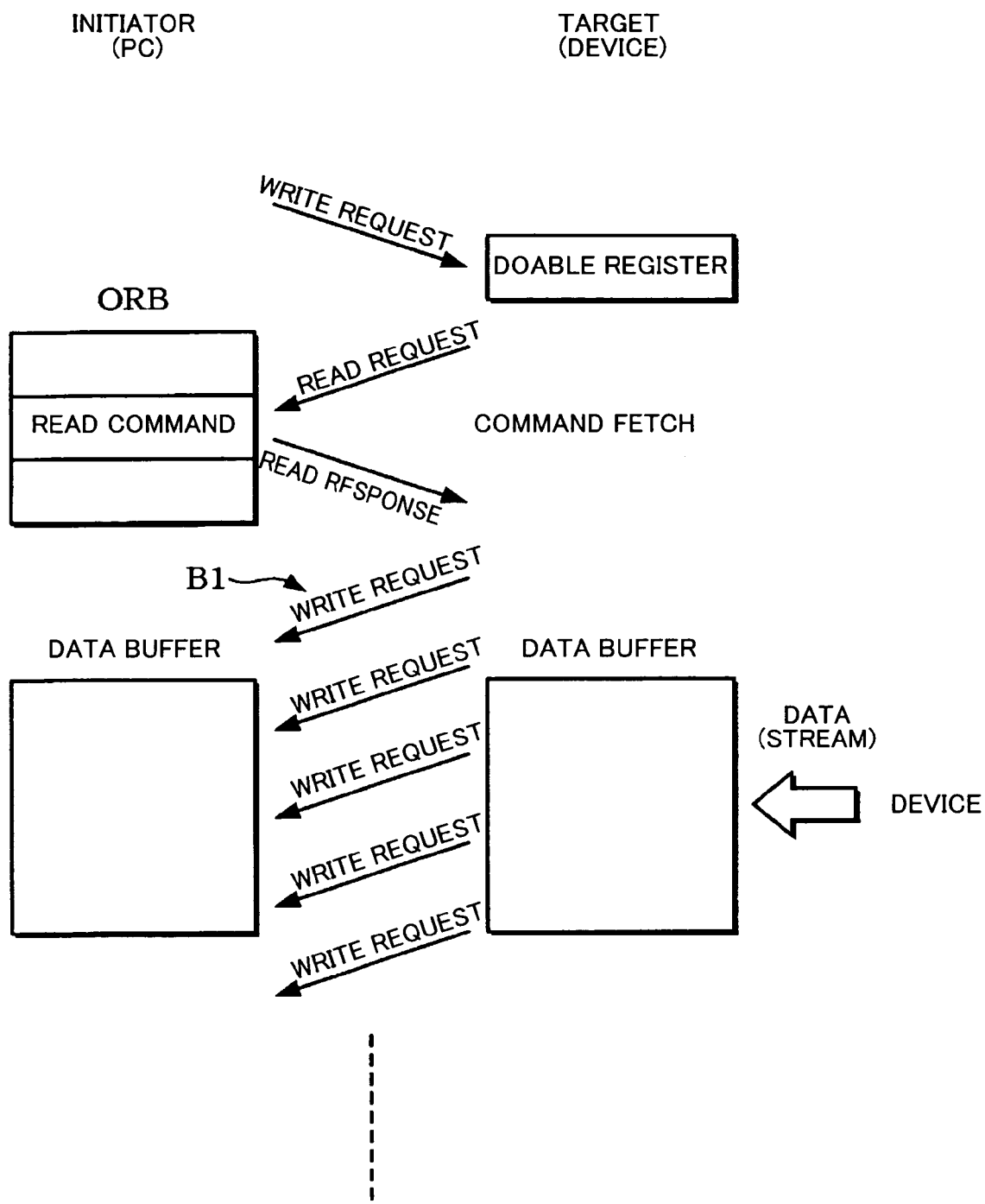
FIG. 4 is illustrative of data transfer from the target to the initiator.

If the command included within the ORB is a SCSI read command, on the other hand, the target transfer a series of write request packets to the initiator, as shown at B1 in FIG. 4. If the target is a storage device, by way of example, this causes the transfer of data that has been read out from the storage device, to the data buffer of the initiator.

This SBP-2 makes it possible for the target to transfer a request packet (issue a transaction) whenever its own circumstances are good, to transfer data. Since it is therefore not necessary for the initiator and target to be synchronized, it enables an increase in data transfer efficiency.

Note that optimal AV/C commands have been proposed for the transfer of image and audio data as an upper-level protocol for IEEE 1394, other than SBP-2 optimized for data transfer for storage devices and printers. A protocol called IPover1394 has also been proposed for the transfer of Internet protocol (IP) packets on the IEEE 1394 bus.

Note that when data transfer occurs between the target and the initiator, a page table is either present in the data buffer of the initiator (a personal computer, or another node) as shown in FIG. 5A, or absent (does not exist).

If a page table is present, an address in the data buffer (initiator) for that page table and the number of elements of the page table (the number of page table elements) are included within the ORB created by the initiator. The address for the transfer data (start address, read address, or write address) is specified as an indirect address by using this page table. More specifically, the page table is configured of a plurality of page table elements and each page table element is specified by an element number. Addresses in the data buffer (initiator) of each segment data item of the transfer data are specified by addresses stored in the page table elements of the page table.

If there is no page table, on the other hand, an address and a data length is included in the ORB, as shown in FIG. 5C. The address of transfer data by the address within the ORB is specified as a direct address. Note that whether or not the page table is present can be determined by using a page table presenting flag included by an ORB.

1.3 Bus Reset

Under the IEEE 1394, a bus reset occurs when power is turned on or when devices have been disconnected or connected while power is on. In other words, each node monitors voltage changes at the corresponding port. If a voltage change occurs at a port because of the connection of a new node to the bus, for example, a node that has detected that change informs the other nodes on the bus that a bus reset has occurred. The physical layer of each node informs the corresponding link layer that a bus reset has occurred.

When such a bus reset occurs, topology information such as node IDs is cleared. The topology information is then automatically reset. In other words, tree identification and self identification are performed after a bus reset. The nodes that are to act as management nodes, such as the isochronous resource manager, cycle master, and bus manager are then determined. Ordinary packet transfer starts.

Since the topology information is automatically reset after a bus reset under this IEEE 1394, it is possible to implement a hot-plug configuration in which the cables of electronic instruments can be freely removed or inserted.

Note that if a bus reset occurs during a transaction, that transaction is cancelled. The requesting node that issued the canceled transaction transfers the request packet again, after the topology information has been reset. The responding node does not return a response packet to the requesting node for a transaction that has been canceled by a bus reset.

1.4 Problems During Bus Reset

Various problems can occur if there is a bus reset during data transfer, as described below. Assume, by way of example, that there is a bus reset at the point at which data has been transferred up to the position (address) shown at C1 in FIG. 6A. In such a case, all transactions present during the processing are canceled at the point at which the bus reset occurs. The initiator, such as a personal computer, which has requested the transfer of data by an ORB1 before the bus reset occurred, recreates an ORB2 after the bus reset has occurred, to instruct the other device (such as a storage device, printer device, scanner device, or imaging devices) to restart the data transfer from the beginning, as shown in FIG. 6B. For that reason, a problem can occur in that data is transferred twice when data transfer is restarted at the position shown at C2 in FIG. 6B.

To solve this problem, the prior-art technique disclosed by Japanese Patent Application Laid-Open No. 2001-177537 uses a method such that the contents of the ORB before the bus reset (hereinafter called ORB1) are compared with the contents of the ORB after the bus reset (hereinafter called ORB2), and the data transfer is restarted from the position indicated by C3 in FIG. 6B if the contents of the ORB1 and the ORB2 are the same. The prior-art technique disclosed by Japanese Patent Application Laid-Open No. 2001-177536 uses a method such that a start address ADS1 of transfer data (all the transfer data to be transferred by a page table) before the bus reset is compared with a start address ADS2 of transfer data after the bus reset, and the data transfer is restarted from the same position indicated by C3 if the ADS1 and the ADS2 are the same.

This causes no problems with operating systems (OSs) of the latest specifications, even when the restart of data transfer is based on the result of the comparison of the ORB1 and the ORB2 or the ADS1 and the ADS2. However, it might not be possible to implement a reliable guarantee of normal operation during a bus reset with OSs and application programs that will be on the market in the future.

Figure 6A:
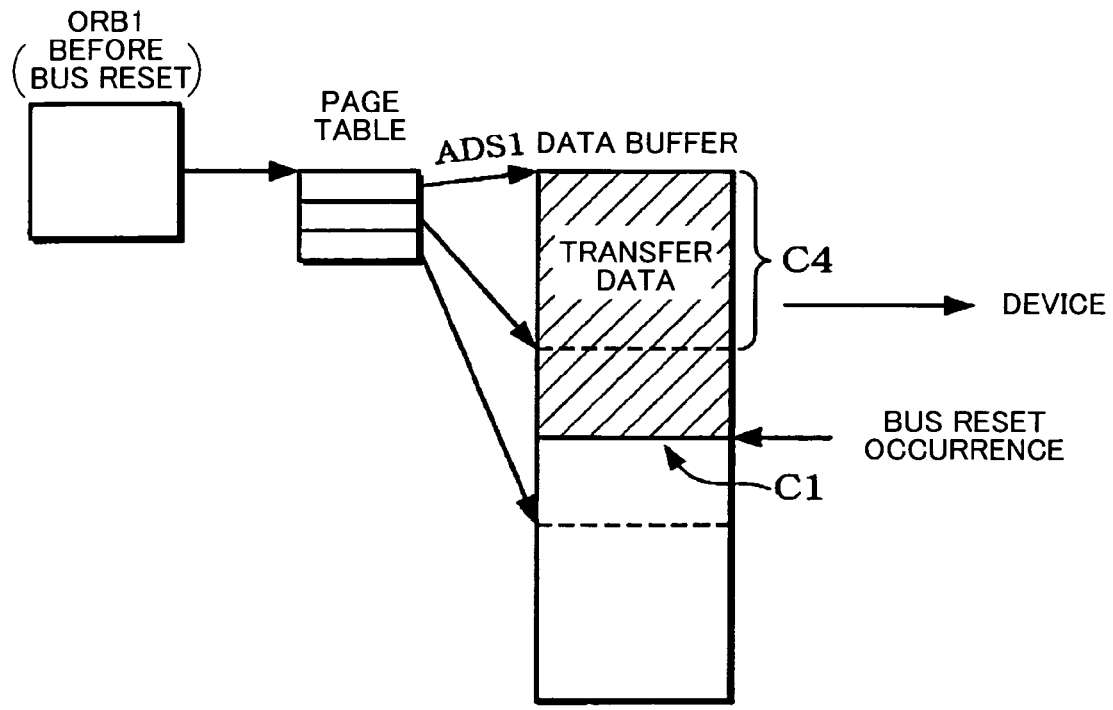
FIGS. 6A and 6B are illustrative of problems that occur when there is a bus reset.
Figure 6B:
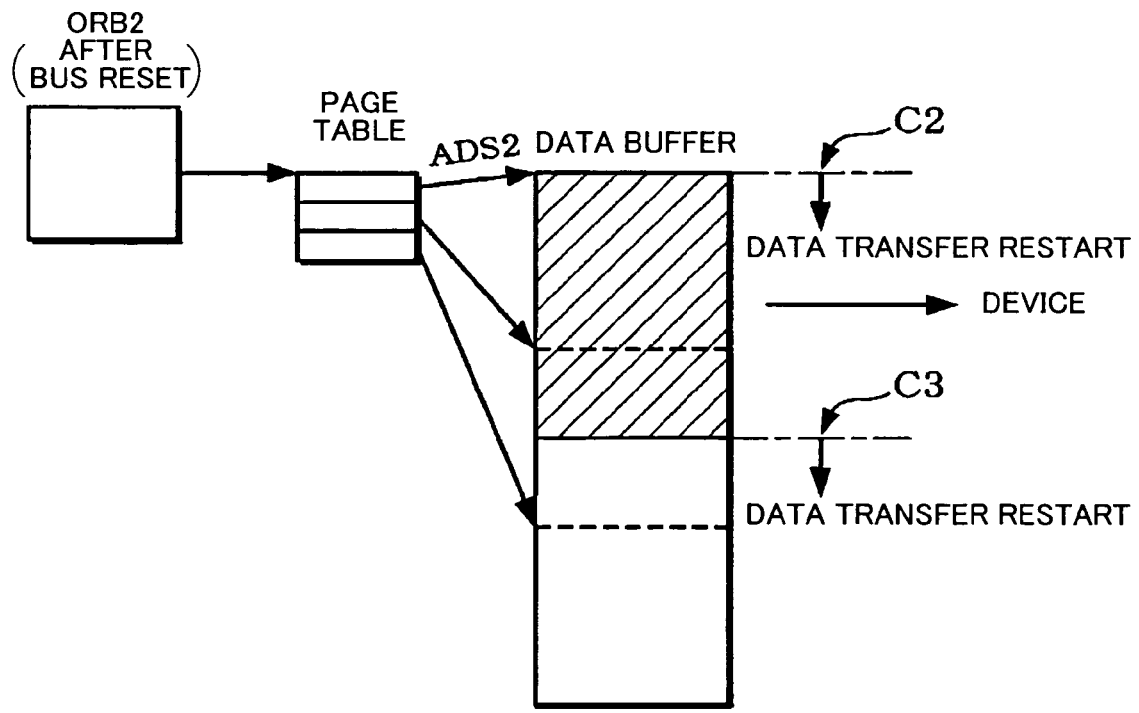

Assume, by way of example, that a bus reset occurs after the segment data indicated by C4 in FIG. 6A has been transferred. In such a case, it could happen that data transfer should not restart, even though the start addresses ADS1 and ADS2 are the same. Specifically, a case could be considered in which the addresses stored in the page table specified by the ORB1 before the bus reset, such as AD1, AD2, AD3, AD4 . . . , do not match the addresses stored in the page table specified by the ORB2 after the bus reset, such as AD1, AD5, AD6, and AD7, depending on the operating specifications of the memory management unit (MMU) of the OS. In such a case, data transfer should not restart even though an address such as the start address (AD1) is the same. If the go-ahead for data transfer restart processing is based solely on a comparison of start addresses, therefore, there is a possibility that normal operation cannot be guaranteed after the bus reset.

The problem described below can also occur with the prior-art techniques. Assume that the ORB1 includes a SCSI (SPC-2) write command, as shown in FIG. 3, and a bus reset occurs during data transfer based on that write command. In such a case, the OS of the personal computer might send the ORB2 including a file allocation table (FAT) read command after the bus reset, to check the contents of the FAT.

In that case, the ORB1 before the bus reset instructs a data write command whereas the ORB2 after the bus reset instructs a FAT read command, so that the contents of the ORB1 and the ORB2 are different. It is therefore necessary to abort the write command of the ORB1 that has already been issued to the later-stage storage device.

If the DMA transfer based on the write command of the ORB1 before the bus reset has already started, aborting that write command might cause a hang-up in the later-stage storage device.

2. Overall Configuration

Figure 7:
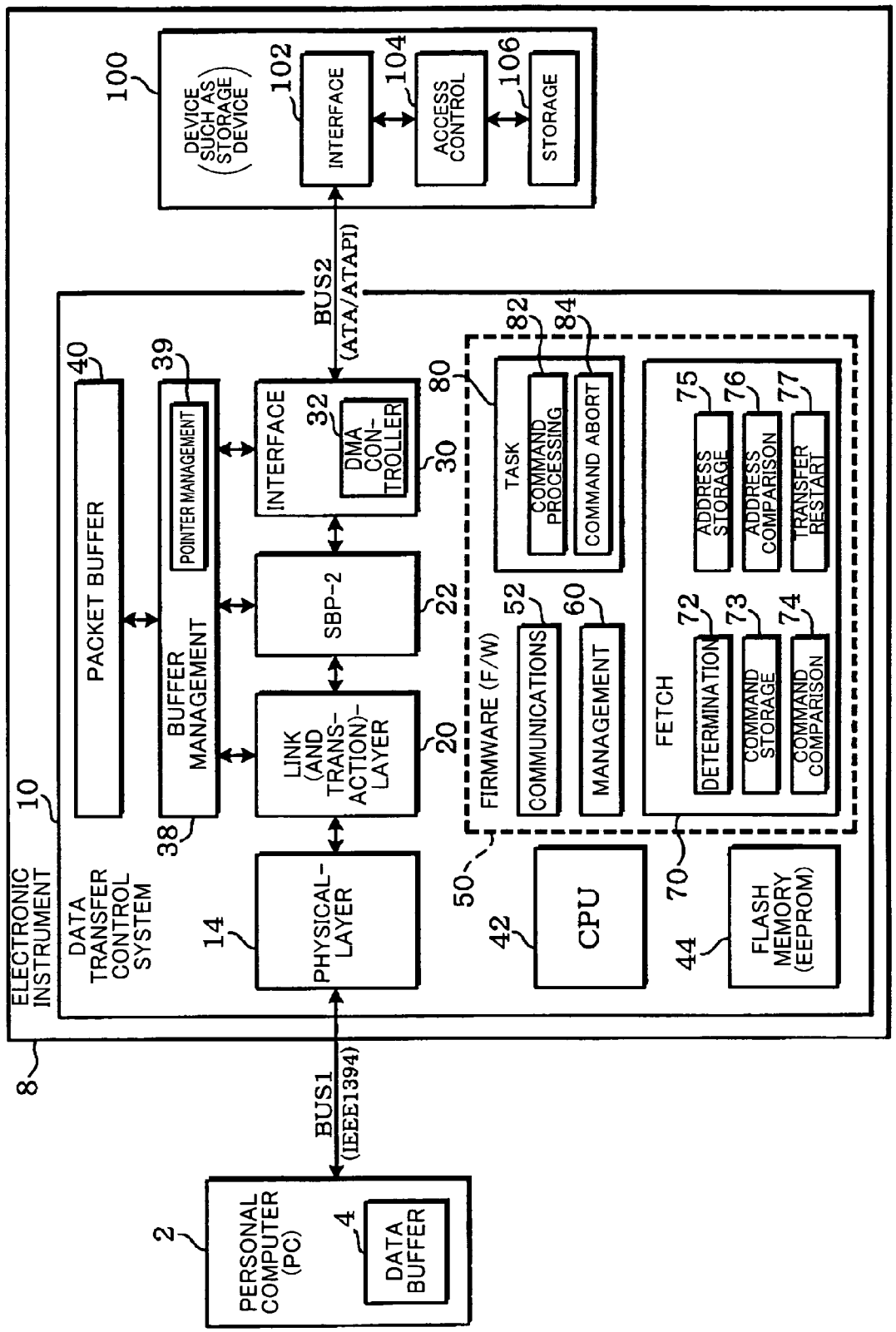
FIG. 7 shows an example of the configuration of a data transfer control system and an electronic instrument.

An example of the overall configuration of the data transfer control system that makes it possible to solve the above problems, and an electronic instrument that incorporates it, is shown in FIG. 7. Note that in the description below, the device 100 that transfers data with respect to the initiator is exemplified as a storage device (such as a hard disk drive, CD drive, or DVD drive), but it should be obvious to those skilled in the art that the present invention is not limited thereto and thus it can be applied to various other devices such as printer devices, scanner devices, or imaging devices.

A personal computer (host computer) 2 having a data buffer 4 is connected to an electronic instrument 8 by a BUS1 (a first bus) conforming to IEEE 1394. The electronic instrument 8 has the data transfer control system 10 and the device 100 (such as a storage device, printer device, or scanner device).

Note that other components such as a system CPU, system memory (ROM, RAM), operating section, or signal processing device (not shown in the figures) could also be included within the electronic instrument 8.

The data transfer control system 10 includes physical-layer (PHY) circuit 14, link-layer circuit 20, SBP-2 circuit 22, an interface circuit 30, a buffer management circuit 38, and a packet buffer 40 (data buffer). It also includes a CPU 42 and flash memory 44 (EEPROM). A processing module (program) therefor is stored in the flash memory 44, including firmware 50 that is executed by the CPU 42 (generally speaking: a processor). Note that the data transfer control system 10 of this embodiment does not necessarily includes all of the circuit blocks and function blocks shown in FIG. 7; some of them can be omitted.

The physical-layer circuit 14 is designed to implement the physical-layer protocol of FIG. 1 in hardware, and it has the function of converting the logical symbols used by the link-layer circuit 20 into electrical signals.

The link (and transaction)-layer circuit 20 is designed to implement the link-layer protocol and part of the transaction-layer protocol of FIG. 1 in hardware, and provides various services for packet transfer between nodes.

These functions of the physical-layer circuit 14 and the link-layer circuit 20 make it possible to perform data transfer that conforms to IEEE 1394 to and from the personal computer 2 (generally speaking: an electronic instrument) through the BUS1 (the first bus).

The SBP-2 circuit 22 (generally speaking: transfer execution circuit) is designed to implement part of the SBP-2 protocol and part of the transaction layer in hardware. These functions of the SBP-2 circuit 22 make it possible to divide transfer data into a series of packets and transfer the thus-divided series of packets continuously.

The interface circuit 30 is designed to provide an interface with the device 100. This function of the interface circuit 30 makes it possible to perform data transfer that conforms to AT attachment (ATA) or ATA packet interface (ATAPI) to and from the device 100 through a BUS2 (a second bus).

The provision of the physical-layer circuit 14, the link-layer circuit 20, and the interface circuit 30, such as those shown in FIG. 7, makes it possible for the data transfer control system 10 to have a conversion bridge function for IEEE 1394 (generally speaking: a first interface standard) and ATA (IDE)/ATAPI (generally speaking: a second interface standard).

A DMA controller 32 included by the interface circuit 30 enables direct memory access (DMA) transfer to and from the device 100 through BUS2. Note that the device 100 connected to BUS2 includes an interface circuit 102 for performing data transfer conforming to ATA (IDE)/ATAPI, an access control circuit 104 for controlling access (write or read access control) to storage 106, and the storage 106 such as an optical disk, hard disk, or memory.

The buffer management circuit 38 manages the interface with the packet buffer 40. The buffer management circuit 38 includes components such as a register for controlling the buffer management circuit 38, an arbitration circuit that arbitrates connections of the packet buffer 40 to the bus, and a sequencer that generates various control signals The buffer management circuit 38 also includes a pointer management section 39. This pointer management section 39 manages pointers of the packet buffer 40 by a ring buffer method, and updates a plurality of pointers for writing and reading.

The packet buffer 40 (packet memory or data buffer) is a buffer for storing packet (transfer data) temporarily, which is configured of hardware such as SRAM, SDRAM, or DRAM. Note that in this embodiment, the packet buffer 40 functions as a packet storage section that can be randomly accessed. The packet buffer 40 could also be connected externally instead of being incorporated into the data transfer control system 10.

The CPU 42 (generally speaking: a processor) controls the entire device and also controls data transfer. The flash memory 44 (EEPROM) is non-volatile memory containing data that can be overwritten electrically. Processing modules (programs) for the firmware 50 are stored in this flash memory 44.

The firmware 50 is a program including various processing modules (processing routines) that run on the CPU 42, and the protocols for layers such as the transaction layer are implemented by this firmware 50 and hardware such as the CPU 42.

The firmware 50 (F/W) includes a communications section 52, a management section 60, a fetch section 70, and a task section 80. Note that the firmware 50 does not necessarily include all of these function blocks (modules); some of them could be omitted.

In this case, the communications section 52 is a processing module that functions as an interface between hardware such as the physical layer circuit 14 and the link-layer circuit 20

The management section 60 (management agent) is a processing module that provides management of tasks such as log-in, reconnection, log-out, and reset. If the initiator has requested log-in at a target, for example, this management section 60 first accepts this log-in request.

The fetch section 70 (fetch agent) is a processing module that receives operation request blocks (ORBs), issues statuses, and handles command processing requests to the task section 80. The fetch section 70 differs from the management section 60, which can only handle a single request, in that it also can handle an ORB link list that it itself has fetched in accordance with a request from the initiator.

The task section 80 is a processing module for executing the processing of commands included by ORBs and also DMA transfers.

The fetch section 70 includes a determination section 72, a command storage section 73, a command comparison section 74, an address storage section 75, an address comparison section 76, and a transfer restart section 77.

In this case, the determination section 72 does processing to determine whether or not a bus reset (a reset that clears node topology information) has occurred during data transfer, from the ORB (generally speaking: a command packet, or a command packet for a data transfer operation request; hereinafter the same).

The command storage section 73 does processing for storing the ORB1 (the first command packet), which was transferred in from the initiator before the bus reset occurred, at a point such as when the bus reset has occurred or a reconnect has succeeded.

The command comparison section 74 does processing for comparing the contents of the ORB1, which was transferred in from the initiator through the BUS1 before the bus reset occurred (and which was stored by the command storage section 73), and the contents of the ORB2, which was transferred in from the initiator through the BUS1 after the bus reset occurred.

The address storage section 75 stores an address (indirect address or direct address). More specifically, if a page table is present (if the page table presenting flag is active), the address storage section 75 stores an address ADK1 (a first address) that is stored in a page table element PEK1 that is one of the page table elements of the page table specified by the ORB1 (see FIG. 5B) that was being processed at the point at which the bus reset occurred. Note that if the page table is absent (if the page table presenting flag is inactive), the address storage section 75 stores an address DAD1 (a first direct address) of the transfer data that is directly specified by the ORB1 (see FIG. 5C).

The address comparison section 76 performs address comparison processing (comparison of the first and second addresses or comparison of the first and second direct addresses). More specifically, if the page table is present, it reads out an address ADK2 that is stored in a page table element PEK2 having the same element number as the page table element PEK1 in which the previously mentioned ADK1 is stored, from the page table elements of the page table specified by the ORB2 after the bus reset. It then compares ADK1 (the first address) stored in the address storage section 75 and the thus-read ADK2 (the second address). Note that if the page table is absent, the address comparison section 76 compares the DAD1 (the first direct address) stored in the address storage section 75 and the DAD2 (the second direct address) that is specified directly by the ORB2.

The transfer restart section 77 does processing to restart the data transfer. More specifically, if it has been determined that the contents of the ORB1 (the first command packet) and the ORB2 (the second command packet) are the same and the ADK1 (the first address) and the ADK2 (the second address) are the same, it performs processing to restart the data transfer as a continuation of the data transfer at the point at which the bus reset occurred. Even more specifically, if it is determined that the ADK1 (the first address) and the ADK2 (the second address) are the same, it performs restart processing for the data transfer at the page table element that was reached during the processing at the point at which the bus reset occurred. Note that it also performs restart processing for the data transfer if the page table is absent and it has been determined that the DAD1 (the first direct address) and the DAD2 (the second direct address) are the same.

The task section 80 includes a command processing section 82 and a command abort section 84. In this case, the command processing section 82 does various types of processing relating to an ORB (generally speaking: a command packet, or a command packet for a data transfer operation request) that has been transferred in through the BUS1 (a first bus of a first interface standard such as IEEE 1394). Specifically, it receives an ORB from the BUS1 and issues the command included by the ORB (a SCSI, SBP-2 command) to the device 100 (storage device) connected to the BUS2 (a second bus of a second interface standard such as ATA/ATAPI), to instruct the start of DMA transfer (data transfer without the intervention of the CPU) through the BUS2.

The command abort section 84 aborts the command (such as a SCSI read command or write command) that was issued for the device 100, based on the ORB, after the DMA transfer (continuous data transfer) started by that ORB (command) has ended.

More specifically, the command abort section 84 operates if there is to be no data transfer restart processing (such as if it has been determined that the contents of the ORB1 before the bus reset are different from the contents of the ORB2 after the bus reset, or if it has been determined that the addresses specified by the ORB1 and the ORB2 either indirectly or directly are different), to abort (halt or cancel) the command that was issued for the device 100 based on the ORB1, after the DMA transfer that was started on the basis of that ORB1 (command) has ended.

In such a case, the command abort section 84 performs control to ensure that dummy data is transferred to or from the device 100 until the DMA transfer started by the ORB is complete.

In other words, the data transfer control system 10 of this embodiment, which has a bus conversion bridge function, usually transfers data that has come in through the BUS2 from the device 100 to the personal computer 2 through the BUS1. It also transfers data that has come in from the personal computer 2 through the BUS1 to the device 100 through the BUS2.

In contrast thereto, when dummy data is transferred, dummy data from the device 100 through the BUS2 is transferred to the data transfer control system 10 but that dummy data is not transferred to the personal computer 2. Similarly, data from the personal computer 2 through the BUS1 is not transferred to the data transfer control system 10 but dummy data is transferred to the device 100 through the BUS2.

Note that the abort processing of the command abort section 84 is done after the reconnect processing done after a bus reset has ended.

3. Details of Processing

The description now turns to details of the processing of this embodiment, with reference to the flowcharts of FIGS. 8, 9, 10 and 11.

3.1 Overall Processing

Figure 8:
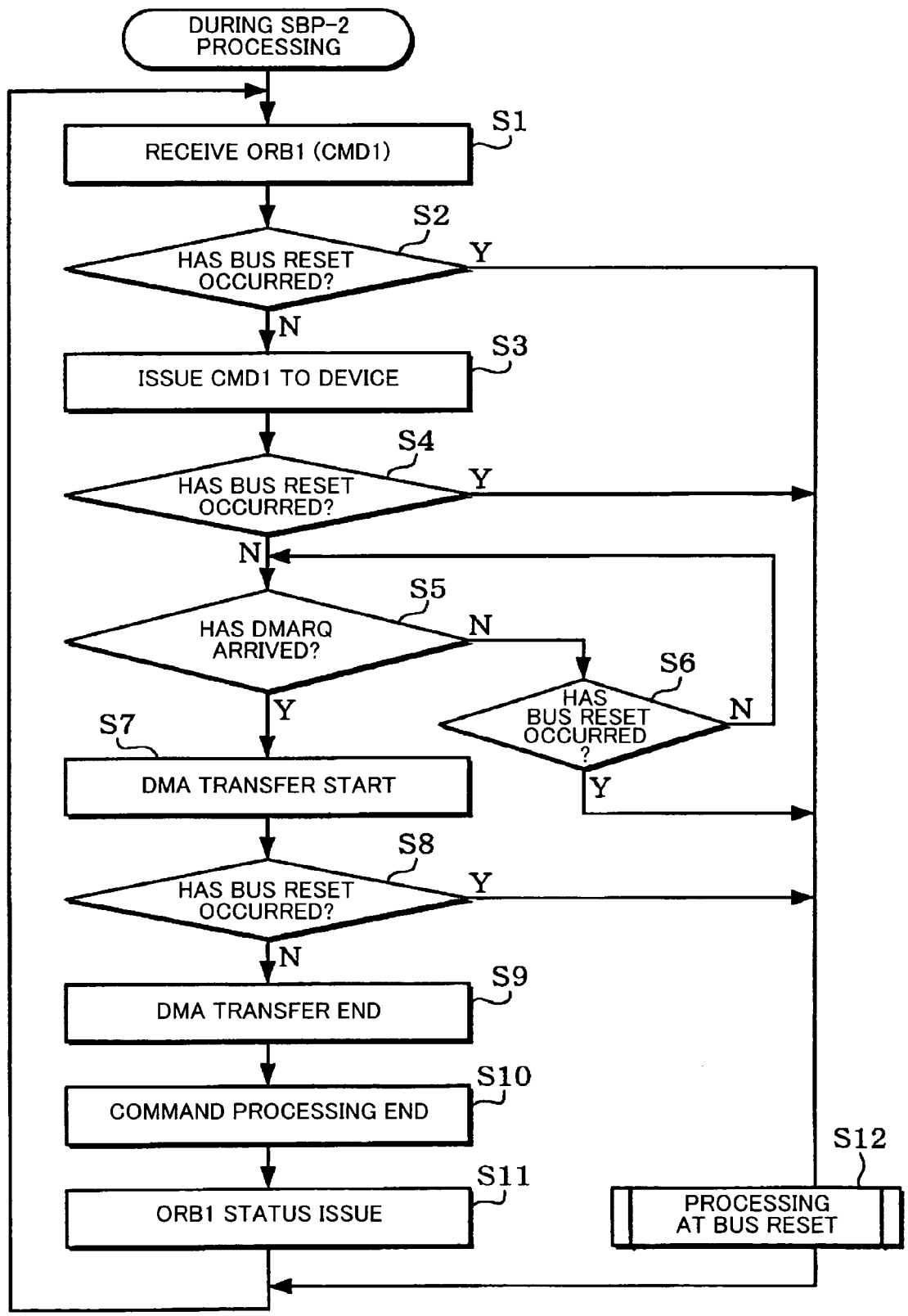
FIG. 8 is a flowchart of a detailed example of the processing in accordance with this embodiment.

FIG. 8 is a flowchart of the entire processing of this embodiment. If the ORB1 including a command CMD1 is accepted during SBP-2 processing (step S1), the system determines whether or not a bus reset has been issued (step S2). If no bus reset has been issued, the command CMD1 included within the ORB1 is issued with respect to the device 100 (storage device), as shown at D1 in FIG. 12 (step S3).

In other words, commands (such as read, write, mode sense, or mode select) that are compatible with SCSI (SPC-2) are used with SBP-2, and the device 100 (storage device) uses those commands to perform operations such as read and write. The data transfer control system 10 of this embodiment extracts the command CMD1 that is included within the ORB1 and issues that CMD1 to the device 100 through the interface circuit 30 and the BUS2 (ATA/ATAPI).

After the CMD1 has been issued, the system determines whether or not a bus reset has occurred (step S4). If no bus reset has occurred, the system determines whether or not DMARQ has arrived from the device 100 through the BUS2 (step S5).

In other words, signals such as DMARQ that is a DMA transfer request and DMACK that is acknowledgement of DMARQ are defined for the BUS2 that conforms to ATA/ATAPI, as will be described later. After the interface circuit 102 of the device 100 has made DMARQ active, DMA transfer starts when the interface circuit 30 of the data transfer control system makes DMACK active.

If DMARQ does not arrive, the system determines whether or not a bus reset has occurred (step S6). If no bus reset has occurred, the system determines whether or not DMARQ has arrived, then repeats steps S5 and S6 until DMARQ does arrive.

When DMARQ arrives, processing such as that to make DMACK active is done, and the start of DMA transfer is instructed (step S7). The configuration is such that data transfer is then done through the BUS1 (IEEE 1394) and the BUS2 (ATA/ATAPI), as shown at D2 and D3 in FIG. 12.

In this case, the data transfer through the BUS1 is implemented by a circuit such as the physical-layer circuit 14, the link-layer circuit 20, and the SBP-2 circuit 22. This data transfer writes data from the data buffer 4 of the personal computer 2 into the packet buffer 40 and reads data from the packet buffer 40 into the data buffer 4.

Data transfer through the BUS2, on the other hand, is implemented by the interface circuit 30 and other components. This data transfer writes data from the packet buffer 40 to the storage 106 of the device 100 and reads in data from the storage 106 to the packet buffer 40.

The system then determines whether or not a bus reset has occurred (step S8), and, if DMA transfer is complete (step S9), the command processing in accordance with the ORB1 ends (step S10), and the status of the ORB1 is passed to the personal computer 2 (step S11). This ends the series of command processing for the ORB1.

3.2 Processing at Bus Reset

Figure 9:
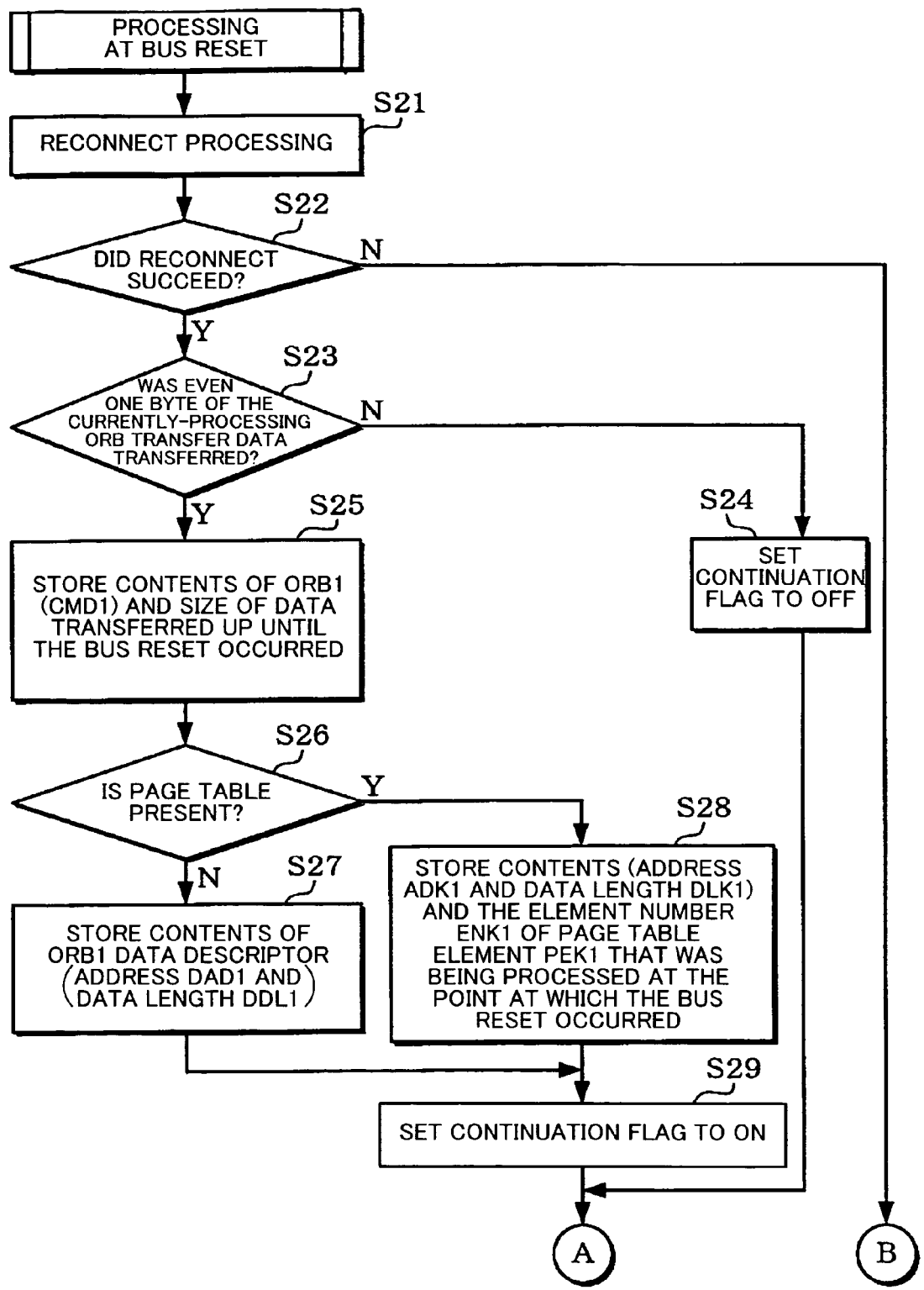
FIG. 9 is another flowchart of a detailed example of the processing in accordance with this embodiment.

If it is determined at step S2, S4, S6, or S8 of FIG. 8 that a bus reset has occurred, the processing for bus reset is performed (step S12). Flowcharts of this processing during a bus reset are shown in FIGS. 9 and 10.

Figure 12:
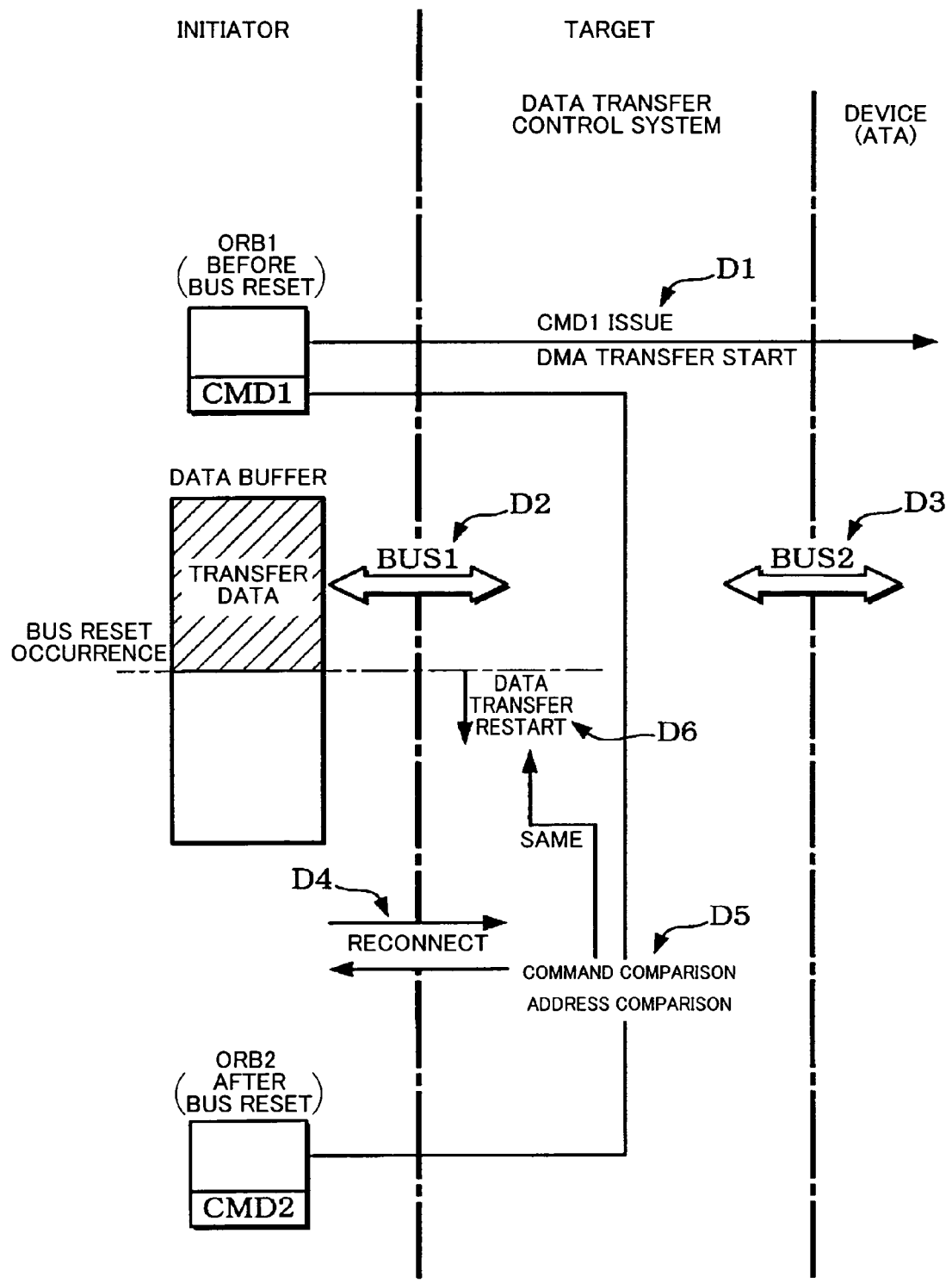
FIG. 12 is illustrative of data transfer restart processing.

First of all, reconnect processing to wait for a reconnect from the initiator is done, as shown at D4 in FIG. 12 (step S21).

In other words, under SBP-2, the initiator that was logged in before the bus reset can have priority to reconnect to that target for a fixed period after a bus reset. After a bus reset, this reconnect processing enables the initiator to monopolize the access right (bus usage right) with respect to that target.

Figure 10:
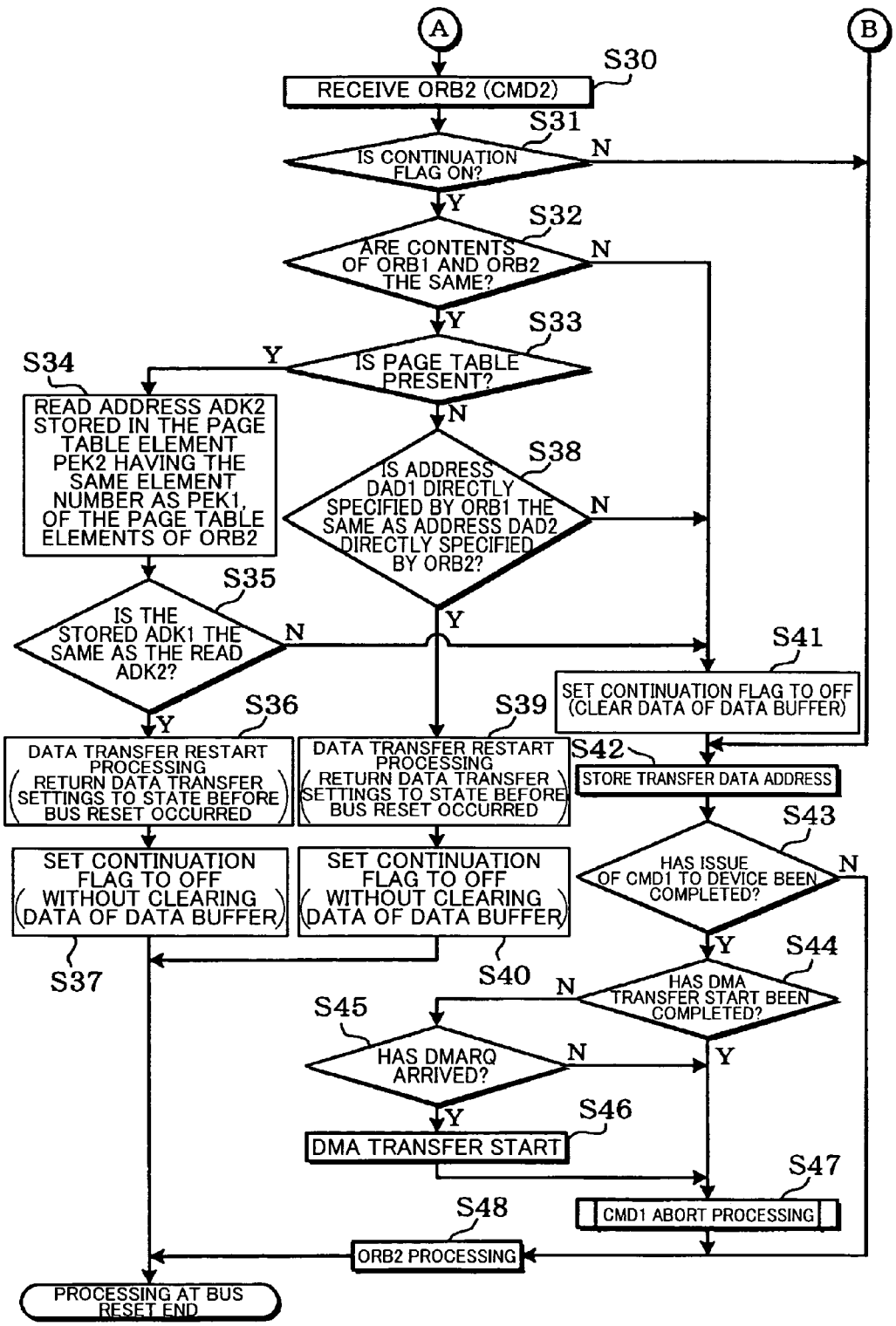
FIG. 10 is a further flowchart of a detailed example of the processing in accordance with this embodiment.

If the reconnect does not succeed (step S22), the flow moves to step S42 of FIG. 10. If the reconnect does succeed, on the other hand, the system then determines whether or not ORB transfer data has been transferred with respect to the device 100 in the next stage (step S23). If not even one byte of data has been transferred, the continuation flag is turned off (step S24).

If even one byte of data has been transferred, on the other hand, the contents of the ORB (such as the data size, the page table presenting flag P, and the command block) and the size of data that could be transferred up until the point at which the bus reset occurs are stored (step S25). This data size corresponds to the total of the number of bytes of data that has already been transferred with respect to the next-stage device 100 at the point at which the bus reset occurred and the number of bytes of data that had already been transferred to the IEEE 1394 bus at the point at which the bus reset occurred and which was either being transferred with respect to the next-stage device 100 or was scheduled to be transferred soon.

The system then determines whether or not the page table is present (step S26), and, if it is absent, it stores the contents of the ORB data descriptor (step S27). In other words, if no page table is present, the address DAD1 (the first direct address) and the data length DDL1 of the transfer data are stored if direct addresses are specified (see FIG. 5C).

If the page table is present, on the other hand, it stores the contents (the address ADK1 and data length DLK1) and the element number of the page table element PEK1 that was being processed at the point at which the bus reset occurred (step S28). It then sets the continuation flag to on (step S29).

3.3 Command Comparison Processing and Address Comparison Processing

Figure 13:
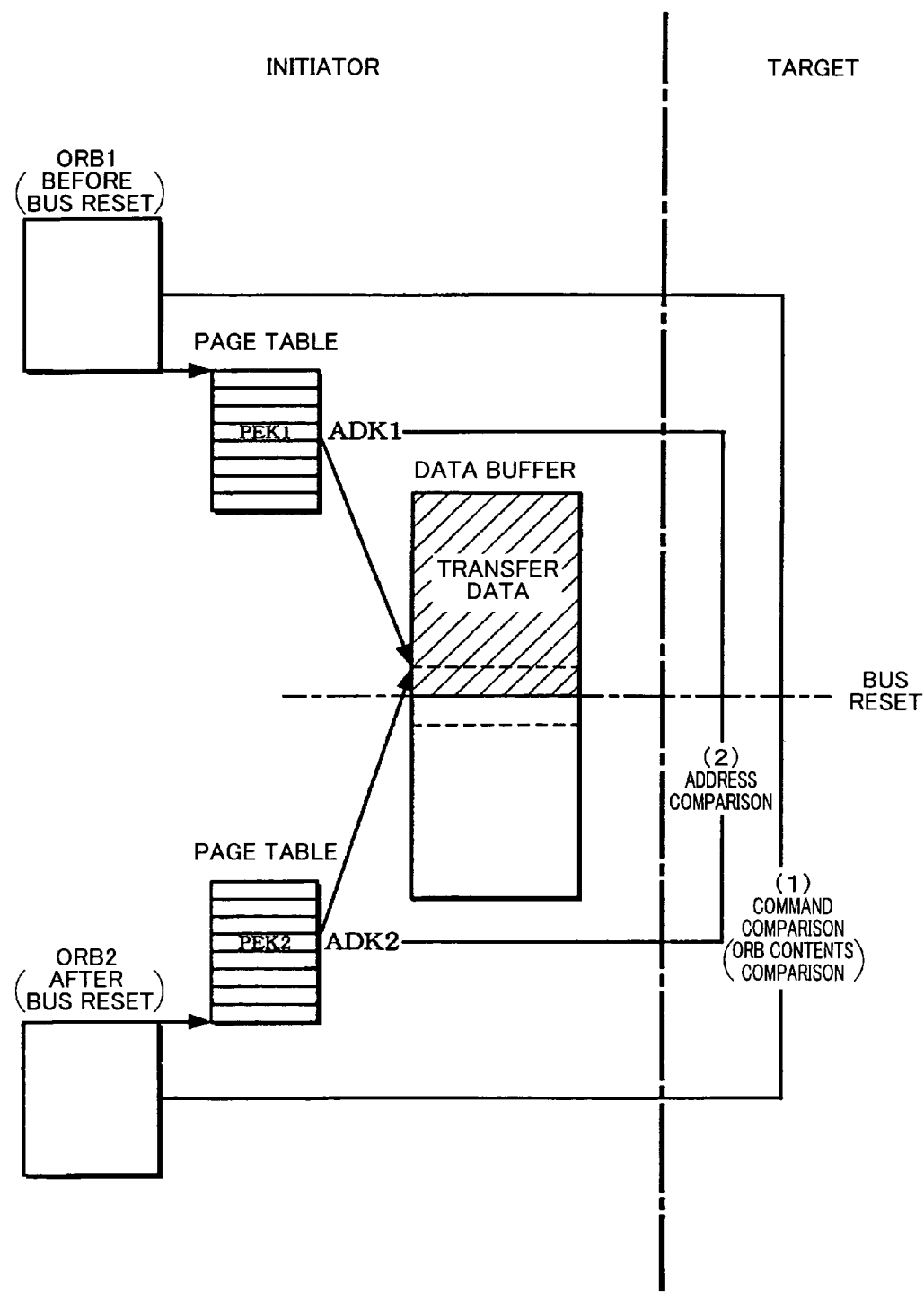
FIG. 13 is further illustrative of data transfer restart processing.

If the ORB2 including a command CMD2 is received (step S30), command comparison processing is performed to compare the contents of the ORB1 (CMD1) before the bus reset and the contents of the ORB2 after the bus reset, or address comparison processing is done to compare the address ADK1 of transfer data before the bus reset and the address ADK2 of transfer data after the bus reset, as shown at D5 of FIG. 12 and in FIG. 13.

The command comparison processing in this case is performed as described below. In other words, the system compares the page table presenting flag P, data size, operation code (a code that differentiates commands such as write command or read command) within the command block (command set) field, and data length included by the ORB of this embodiment, as shown in FIG. 14. If the ORB also includes identification information (such as a sequence number), that identification information could also be compared. Note that the values of data descriptors are compared if no page table is used, but the numbers of segments are compared if a page table is used. Comparing the information in the manner described above makes it possible to reliably determine whether or not the ORB1 before the bus reset and the ORB2 after the bus reset are the same, using simple processing.

Figure 15:
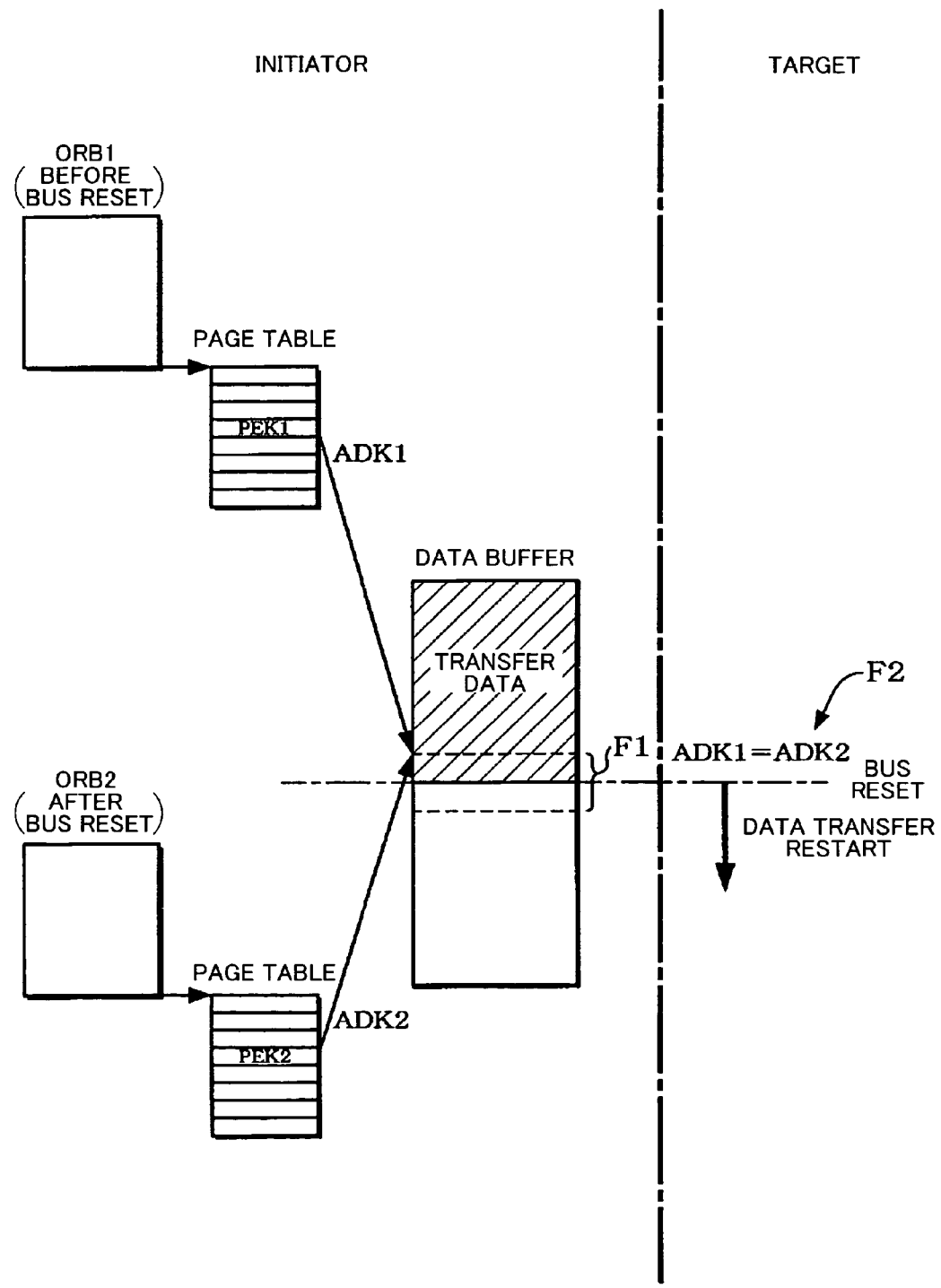
FIG. 15 is illustrative of address comparison processing.

The address comparison processing is as described below. In the prior-art example shown in FIGS. 6A and 6B, the comparison is of the start addresses ADS1 and ADS2 of all the transfer data specified by the page table. In contrast thereto, this embodiment involved a comparison of the address ADK1, which is stored in the page table element that was being processed at the bus reset, and corresponding ADK2, as shown in FIG. 15. In other words, the comparison is of the addresses of the segment data that was being transferred at the bus reset, as shown at F1.

Figure 16:
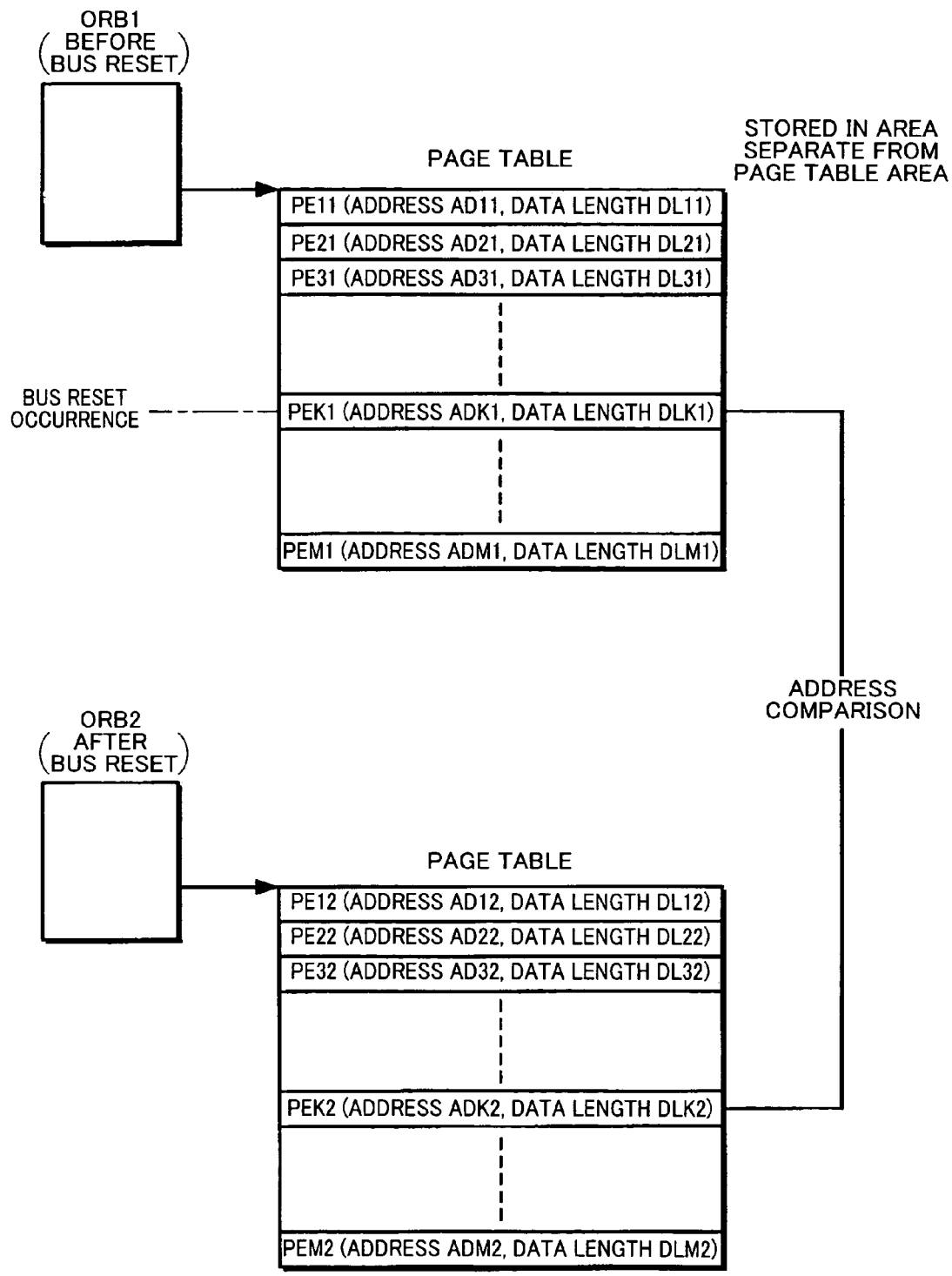
FIG. 16 is further illustrative of address comparison processing.

A page table is composed of a plurality of page table elements (PE11 to PEM1, PE12 to PEM2), as shown in FIG. 16, where these page table elements are specified sequentially by element numbers. Data transfer using this page table is done by reading out addresses (AD11 to ADM1, AD12 to ADM2) stored in the page table elements, in order of the element number by way of example, and using the read-out addresses to specify positions of transfer data as indirect addresses, as described with reference to FIG. 5B.

With this embodiment, the address ADK1 (the first address) stored in the page table element PEK1 that was being processed at the point at which the bus reset occurred, of the page table elements of the page table specified by ORB1 (the first command packet) that has been transferred in through the BUS1 (the first bus), is stored. In other words, the address that is stored is of the segment data at F1 that was being transferred when the bus reset occurred.

When the ORB2 (the second command packet) is transferred in after the bus reset, the address ADK2 (the second address) that is stored in the page table element having the same element number as PEK1, of the page table elements of the page table of the address specified by the ORB2, is read out. When the stored ADK1 and the read-out ADK2 are compared and it is determined that ADK1 and ADK2 are the same, data transfer restarts from the page table element (PEK1) that was being processed at the point at which the bus reset occurred, as shown at F2 in FIG. 15.

Since this embodiment ensures that the data transfer can be restarted from the page table element that was being processed when the bus reset occurred, it is possible to guarantee normal operation at a bus reset in a more reliable manner, in comparison with the prior-art example described with reference to FIGS. 6A and 6B.

In other words, if the storage area for the segment data at C4, where transfer has already ended, is used by another application, it is possible that the start addresses for the transfer data (ADS1 and ADS2) will be different before and after the bus reset, as shown in FIGS. 6A and 6B. Since this embodiment compares the stored addresses (ADK1 and ADK2) of the page table element that was being processed when the bus reset occurred in this case too, there is no inconvenience in data transfer even if the start addresses for the transfer data (ADS1 and ADS2) are different. It is therefore possible to guarantee more reliable data transfer, in comparison with the prior-art example.

Note that it is also possible to compare not only the page table element that was being processed, before and after the bus reset, but also the storage address of a page table element that has already been processed.

Figure 17:
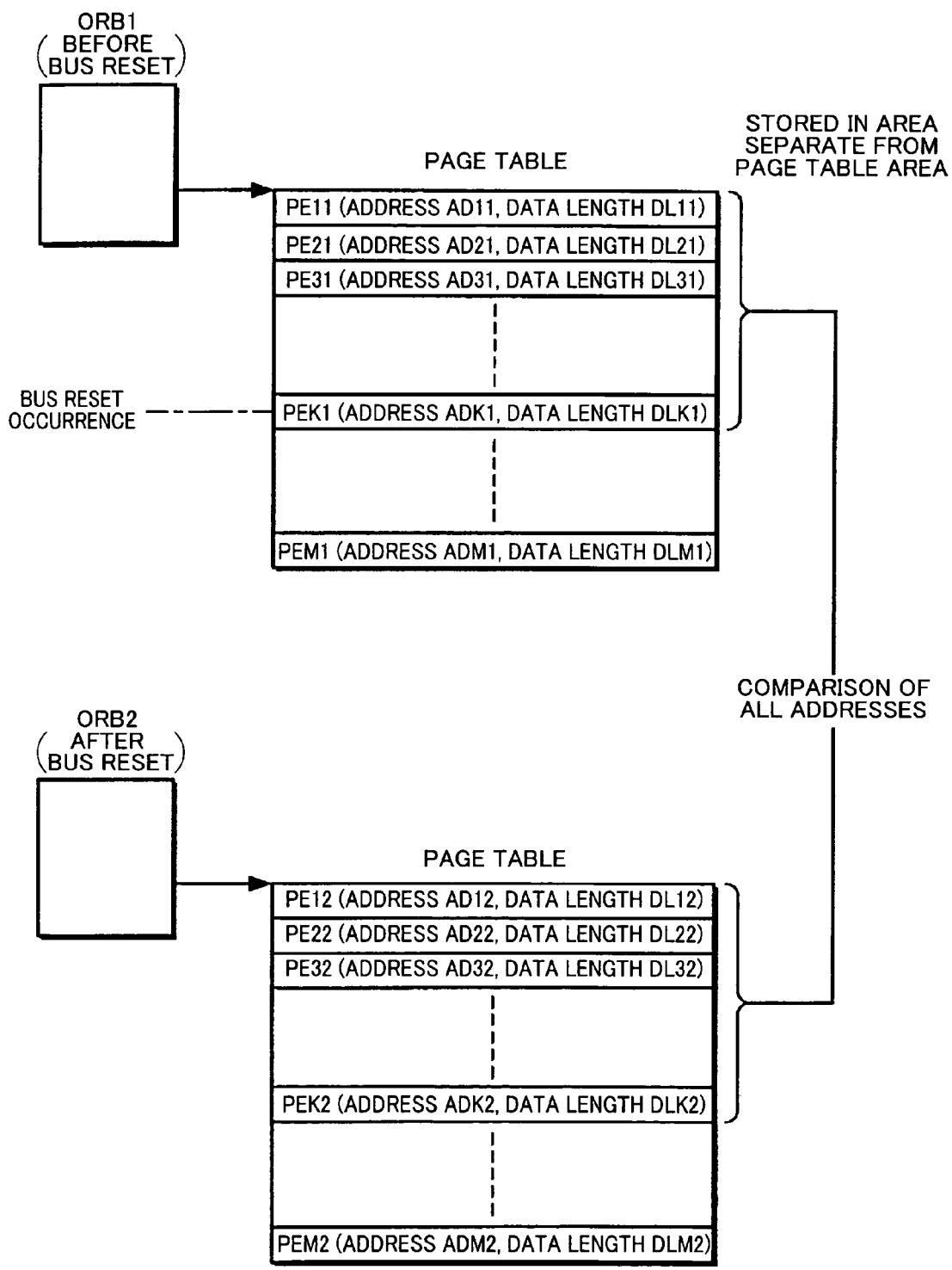
FIG. 17 is still further illustrative of address comparison processing.

More specifically, of the page table elements of the page table having an address that is specified by the ORB1, K (where K is an integer equal to or greater than two) addresses AD11, AD21, AD31 . . . ADK1 (a first address group), which are stored in the K page table elements from the start page table element to the page table element that was being processed, are stored, as shown in FIG. 17.

Of the page table elements of the page table having an address that is specified by the ORB2 after the bus reset has occurred, K addresses AD12, AD22, AD32, . . . ADK2 (a second address group), which are stored in the page table elements having the same element numbers as the K addresses AD11, AD21, AD31, . . . ADK1, are read out. The thus-stored ADI1, AD21, AD31 . . . ADK1 and the read-out AD12, AD22, AD32 . . . ADK2 are compared. The configuration is such that data transfer restarts if it is determined that these addresses are the same. This makes it possible to guarantee data transfer when a bus reset occurs, in a more reliable manner. Note that it is also possible to compare only some of the plurality of page table elements, instead of the stored addresses of all the page table elements from the initial page table element to the page table element that was being processed.

The description returns to the flowchart of FIG. 10. If the ORB2 (CMD2) is received after the bus reset (step S30), the system determines whether or not the continuation flag is on (step S31). This continuation flag is the flag that was turned on at step S29 of FIG. 9. If the continuation flag is off, the flow moves on to step S42.

If the continuation flag is on, the system determines whether or not the ORB1 before the bus reset and the ORB2 after the bus reset are the same, as described with reference to FIG. 14 (step S32). In such a case, the contents of the ORB1 that are compared with the ORB2 are stored in step S27 of FIG. 9.

If the contents of the ORB1 and the ORB2 are the same, the system determines whether or not the page table is present (step S33). This can be done by checking the page table presenting flag P of FIG. 14. If the page table is present, the address ADK2 is read from the page table element PEK2 having the same element number as PEK1, of the page table elements of the ORB2, as described with reference to FIGS. 15 and 16 (step S34). The system determines whether or not the address ADK1 that was stored in step S28 of FIG. 9 is the same as the thus-read address ADK2 (step S35). If the ADK1 and ADK2 are the same, it performs data transfer restart processing (step S36). In other words, the data transfer setting returns to the state it was in before the bus reset occurred, to enable the data transfer to restart at the point at which the bus reset occurred, based on data such as the data size that has been transferred up until the point at which the bus reset occurs, as stored in step S25 of FIG. 9, and the contents of the page table element and the element number that were stored in step S28. The continuation flag returns to off (step S37). In this case, the data in the data buffer of the target should not be cleared, so that the data that had already been transferred before the bus reset may not be lost.

If it was determined at step S33 that the page table is absent, the system determines whether or not the address DAD1 specified directly by the ORB1 and the address DAD2 specified directly by the ORB2 are the same (step S38). If it is determined that the DAD1 (the first direct address) and the DAD2 (the second direct address) are the same, the system returns the data transfer setting to the state before the bus reset occurred and performs data transfer restart processing (step S39). It then returns the continuation flag to off (step S40). In this case, the data in the data buffer of the target should not be cleared, so that the data that had already been transferred before the bus reset may not be lost.

With this embodiment configured as described above, the stored addresses ADK1 and ADK2 of the page table elements are compared if the page table is present (step S35), whereas the addresses DAD1 and DAD2 specified directly by the ORB1 and the ORB2 are compared if the page table addresses is absent (step S38). This makes it possible to guarantee normal operation at a bus reset, regardless of whether or not the page table is present.

If it is determined at step S31 that the contents of the ORB1 and the ORB2 are not the same, if it is determined at step S35 that the addresses ADK1 and ADK2 are not the same, or if it is determined at step S38 that the DAD1 and DAD2 are not the same, the system sets the continuation flag to off and also stores the address of the transfer data, without performing data transfer restart processing (steps S41 and S42).

The system then determines whether or not the CMD1 included by the ORB1 has already been issued with respect to the device 100 (step S43). If the CMD1 has not been so issued, the system does not perform command abort processing and moves on to processing of the ORB2 that has been newly transferred in (step S48). With the thus-configured embodiment, if a bus reset occurred during the processing of the CMD1, abort processing (step S47) is done if it is determined that the issue of the CMD1 has been completed (step S43), but abort processing is not done and the flow moves on to the processing of the ORB2 (CMD2) if it determined that the CMD1 has not been issued (step S48).

If the CMD1 has already been issued to the device 100, the system determines whether or not DMA transfer start has been completed (step S44). If it has started, the system moves on to abort processing for the command CMD1 (step S47), as shown at E5 in FIG. 18. If the CMD1 has not been issued, on the other hand, the system determines whether or not the DMA transfer request DMARQ has arrived (step S45), and, if DMARQ has not arrived, it moves on to CMD1 abort processing. If DMARQ has arrived, on the other hand, the system moves on to CMD1 abort processing after instructing the start of DMA transfer (step S46). When CMD1 abort processing ends, the flow moves on to processing for the ORB2 (CMD2) (step S48).

3.40 mission of Address Comparison Processing when Page Table Is Present

If it is determined at steps S34 and S35 that the page table is present, the addresses ADK1 and ADK2 stored in the page table elements PEK1 and PEK2 are compared, but it is also possible not to perform this comparison processing. An example of the flowchart of processing in such a case is shown in FIG. 25.

Figure 25:
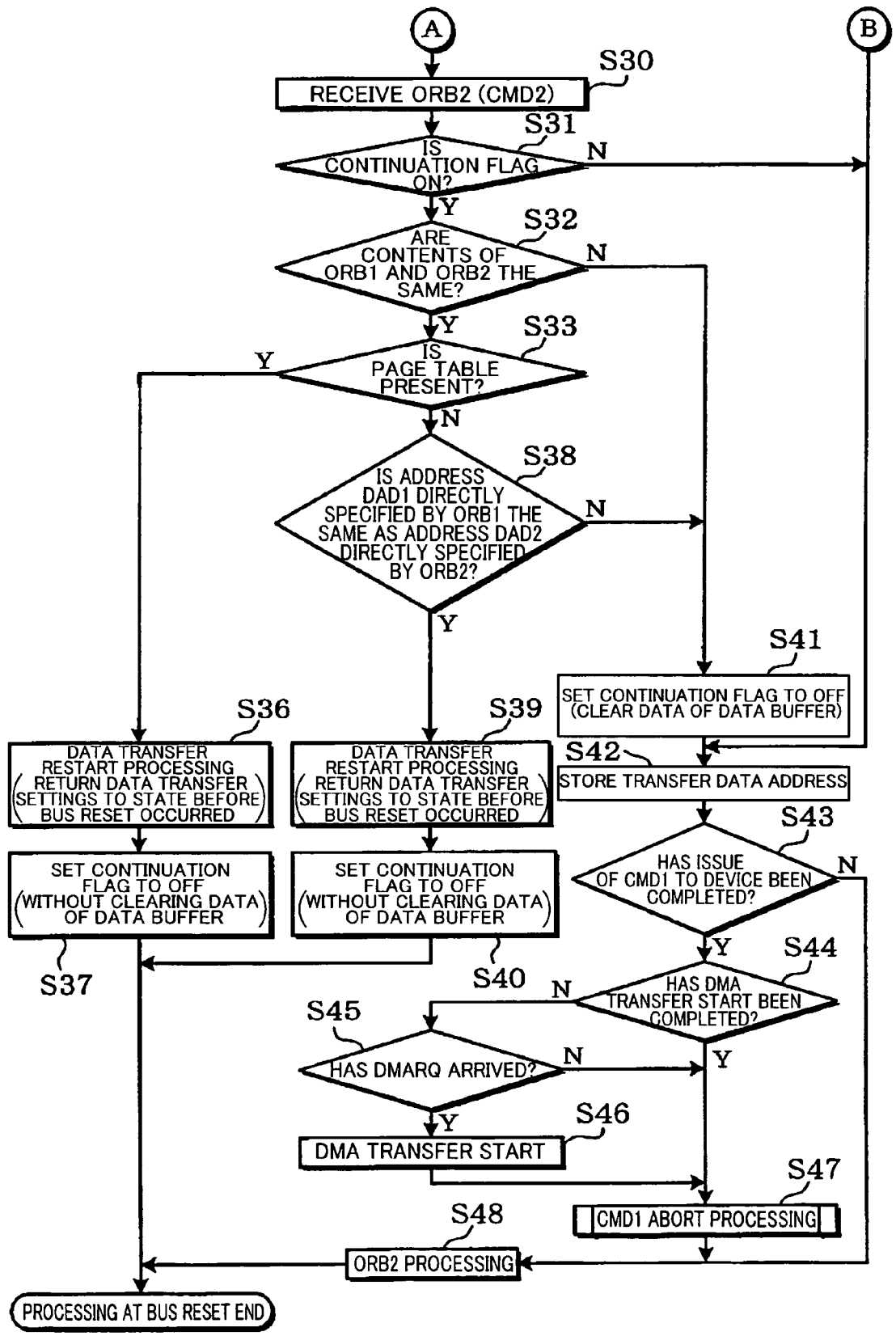
FIG. 25 is a flowchart showing the omission of address comparison when a page table is present.

If the ORB2 (the second command packet) has been transferred in after the bus reset occurred, the contents of the ORB2 after the bus reset occurred are compared with the contents of the ORB1 (the first command packet) before the bus reset occurred by the command comparison section 74 (see FIG. 7), as shown at step S32 in FIG. 25. In this case, the contents of the ORB1 are those that were stored by the command storage section 73 in step S25 of FIG. 9.

It is then determined whether or not the page table is present (step S33) and, if the page table is present, data transfer restart processing (restart processing for data transfer from the point at which the bus reset occurred) is done by the transfer restart section 77 (step S36). In other words, data transfer is restarted if it is determined that the contents of the ORB1 and the ORB2 are the same, provided there is a page table. Thus the data transfer is restarted without the processing of steps S34 and S35 of FIG. 10.

If the page table is absent, on the other hand, the DAD1 (the first direct address) that is specified directly by the ORB1 and the DAD2 (the second direct address) that is specified directly by the ORB2 are compared by the address comparison section 76 (step S38). In this case, the DAD1 is the one that was stored by the address storage section 75 in step S27 of FIG. 9 when the page table is absent.

If it determined in step S38 that the DAD1 and the DAD2 are the same, data transfer restart processing (restart processing for data transfer from the point at which the bus reset occurred) is done by the transfer restart section 77 (step S39). In other words, data transfer is restarted if the page table is absent and it is determined that the contents of the ORB1 and the ORB2 are the same and also that the DAD1 and the DAD2 are the same It might be possible to guarantee appropriate data transfer restart processing, even without comparing addresses stored in the page table elements, depending on the way in which the OS processes or the type of the device 100 (such as a storage device). In such a case, it would be possible to reduce the processing load by restarting the data transfer without performing the address comparison processing of steps S34 and S35 of FIG. 10.

3.5 Command Abort Processing

Figure 11:
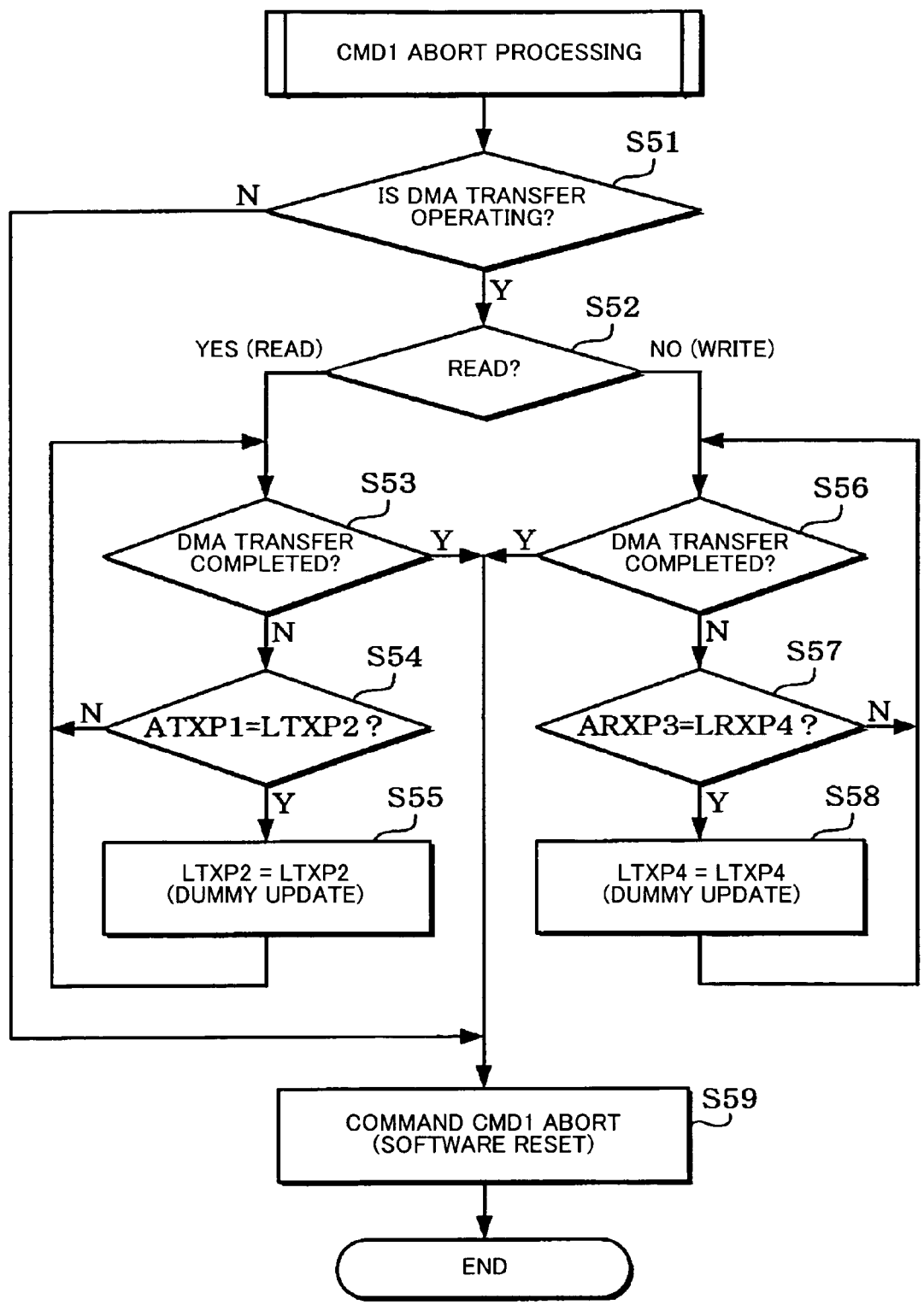
FIG. 11 is a still further flowchart of a detailed example of the processing in accordance with this embodiment.

A flowchart relating to CMD1 abort processing is shown in FIG. 11. First of all, the system determines whether or not DMA transfer is operating (step S51). If it is determined that DMA transfer has not started at step S44 of FIG. 10 and if it is determined that DMARQ has not yet arrived at step S45, by way of example, it is possible to determine that DMA transfer is not operating at step S51 of FIG. 11. In such a case, the command CMD1 is aborted without controlling the dummy data transfer control processing of steps S52 to S58. This makes it possible to omit the processing of steps S52 to S58, making the processing more efficient.

If it has been determined that DMA transfer is operating, the system determines whether the command CMD1 is a read command or a write command (step S52).

Figure 18:
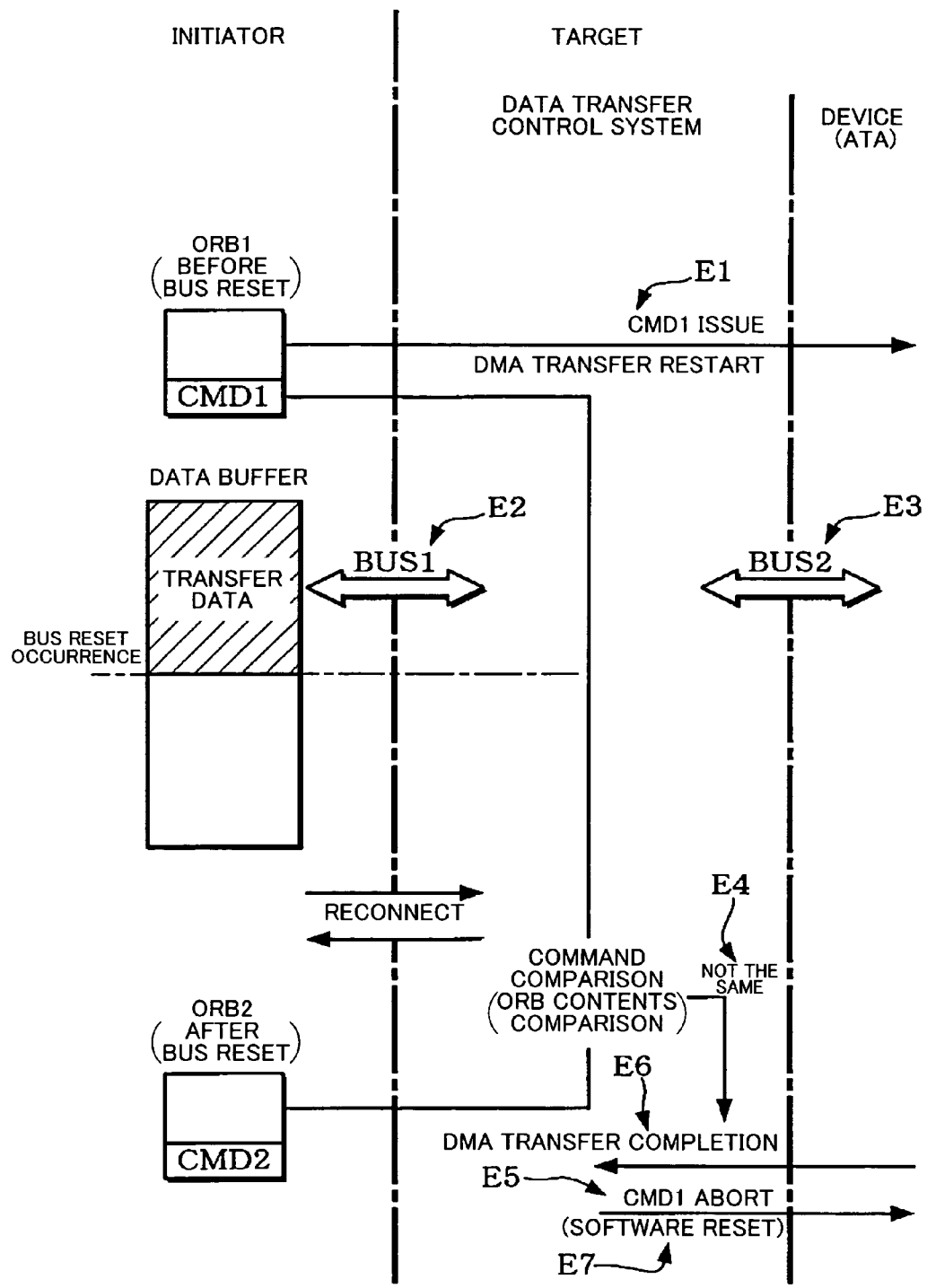
FIG. 18 is illustrative of command abort processing.

If the CMD1 is a read command, the system then determines whether or not the DMA transfer for the CMD1 has been completed, as shown at E6 in FIG. 18 (step S53). The dummy data transfer (read) processing of steps S53 to S55 is done with respect to the device 100 until the DMA transfer is complete. If it is determined that the DMA transfer is complete, abort processing for the command CMD1 is done, as shown at E7 in FIG. 18 (step S59).

Similarly, if the CMD1 is a write command, the system then determines whether or not the DMA transfer for the CMD1 has been completed (step S56). The dummy data transfer (write) processing of steps S56 to S58 is done with respect to the device 100 until the DMA transfer is complete. If it is determined that the DMA transfer is complete, abort processing for the command CMD1 is done (step S59).

Note that the command abort processing could be implemented by a software reset that is defined by ATA/ATAPI, by way of example. Specifically, this software reset could be executed by setting an SRST bit of a device control register of the interface circuit 102 of the device 100 to 1. This setting of a value in the register can be implemented by the interface circuit 30 accessing the register of the interface circuit 102, by PIO transfer using BUS2 signals such as CS[1:0], DA[2:0], DIOW, and DIOR, as will be described later.

Note that, instead of performing SRST (a software reset), end processing could be done by executing an interrupt processing function, when an ordinary completion interrupt (IN-TRQ) has been input from the device 100 as a result of the transfer of dummy data.

With this embodiment as described above, the command CMD1 issued by the device 100 before the bus reset (see step S3 of FIG. 8 and E1 in FIG. 18) is aborted (see step S59 of FIG. 11 and E7 in FIG. 18) after the DMA transfer (see step S7 of FIG. 8, step S46 of FIG. 10 and E3 in FIG. 18) started by the ORB1 (CMD1) has been completed.

This ensures that the command CMD1 is aborted after the DMA transfer through the device 100 and the BUS2 has ended normally. Since the device 100 can therefore complete the DMA transfer normally, it is possible to prevent a situation in which the device 100 hangs. Since the DMA transfer through the BUS2 until the command CMD1 is aborted is done by dummy data transfers, there is no adverse effect on the processing of the personal computer 2.

In particular, the device 100 that is provided with the ATA (IDE)/ATAPI interface was originally designed as an internal storage device for the personal computer 2, so it was not designed from consideration of the occurrence of a IEEE 1394 bus reset during DMA transfer. It is therefore highly likely that, if the device 100 is connected to the data transfer control system 10 of this embodiment, which is provided with an IEEE 1394 and ATA/ATAPI bridge function, the occurrence of an unpredicted bus reset could cause the device 100 to hang. Since embodiment of the invention makes it possible to abort a command after DMA transfer is complete, it enables the prevention of such a hang-up before it occurs.

4. Transfer of Dummy Data

The description now turns to the transfer of dummy data in steps S53 to S55 and S56 to S58 of FIG. 11, with reference to FIGS. 19A to 19E and 20A to 20E.

FIGS. 19A to 19E are illustrative of pointer control of the packet buffer 40 during the reading of data from the device 100 to the personal computer 2 (during the transmission of data transfer control system 10 data).

In FIGS. 19A to 19E, a pointer ATXP1 (a first pointer) is a pointer for writing transfer data from the BUS2 (the device 100, ATA/ATAPI) to the packet buffer 40, which is updated every time transfer data is written from the BUS2. Similarly, a pointer LTXP2 (a second pointer) is a pointer for reading out transfer data from the packet buffer 40 to the BUS1 (the personal computer 2, IEEE 1394), which is updated every time transfer data is read out to the BUS1. The updating of these pointers is done by the pointer management section 39.

Figure 19A:
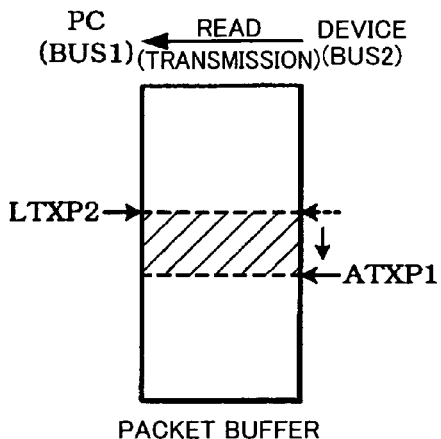
FIGS. 19A to 19E are illustrative of dummy data transfer processing.
Figure 19B:
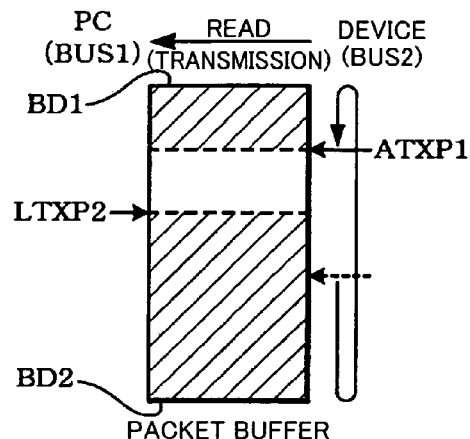

As shown in FIG. 19A, every time transfer data from the BUS2 is written by the interface circuit 30 to the packet buffer 40, the pointer ATXP1 is updated and the position it indicates moves downward (in the direction in which data accumulates). The pointer ATXP1 is managed by a ring buffer method. Thus, when the pointer ATXP1 reaches a lower boundary BD2 of the store area, ATXP1 returns to an upper boundary BD1 of the store area (forms a ring), as shown in FIG. 19B.

Figure 19C:
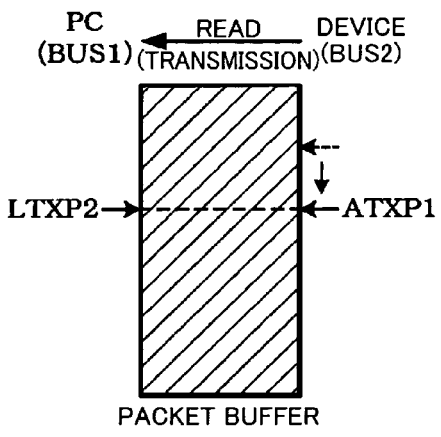

When it is determined that ATXP1=LTXP2 (step S54 of FIG. 11), data has accumulated in the entire store area of the packet buffer 40, as shown in FIG. 19C. Note that the shaded portions of FIGS. 19A to 19E denote accumulated data.

Figure 19D:
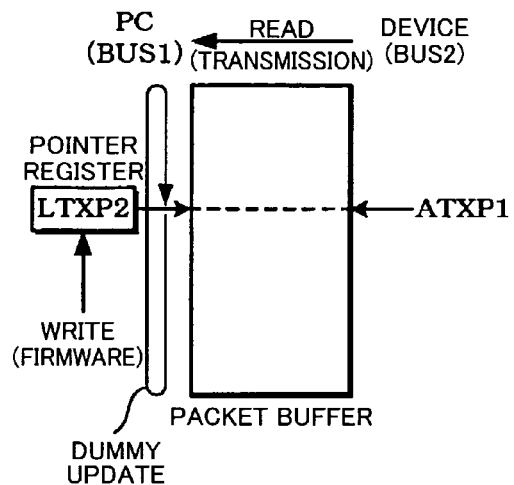
Figure 19E:
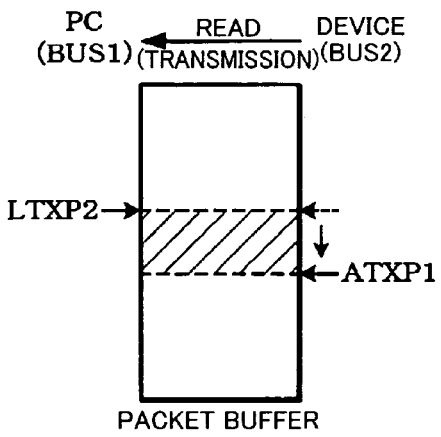

When that happens with this embodiment, the same value as LTXP2 is re-written to the LTXP2 pointer register, as shown in FIG. 19D (step S55 of FIG. 11). This performs a dummy update of the pointer LTXP2, giving a similar result as the read-out of all the accumulated data in the store area. The pointer ATXP1 is subsequently updated as shown in FIG. 19E and the transfer data is written from the BUS2 to the store area from which a pseudo read-out has been performed. The pointer control of FIGS. 19A to 19E is repeated until the DMA transfer is complete (step S53 of FIG. 11), to transfer dummy data with respect to the BUS2.

This embodiment configured as described above succeeds in implementing dummy data transfer by performing dummy updates of LTXP2 (the second pointer) in such a manner that LTXP2 is not surpassed by the ATXP1 (the first pointer) that is updated every time transfer data from the BUS2 is written.

FIGS. 20A to 20E are illustrative of pointer control of the packet buffer 40 during the writing of data by the personal computer 2 to the device 100 (during the reception of data transfer control system 10 data).

In FIGS. 20A to 20E, a pointer ARXP3 (a third pointer) is a pointer for reading out transfer data from the packet buffer 40 to the BUS2, which is updated every time transfer data is read out to the BUS2. Similarly, a pointer LRXP4 (a fourth pointer) is a pointer for writing transfer data from the BUS1 to the packet buffer 40, which is updated every time transfer data is written from the BUS1. The updating of these pointers is done by the pointer management section 39.

Figure 20A:
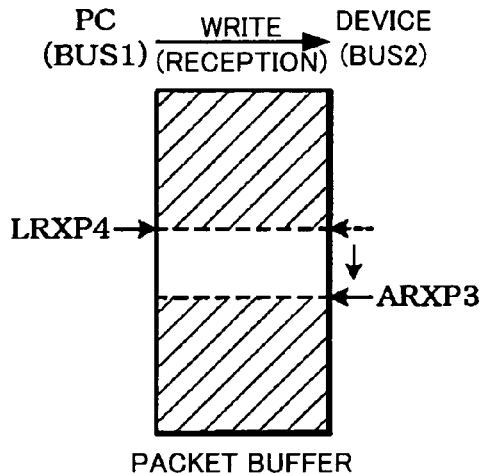
FIGS. 20A to 20E are further illustrative of dummy data transfer processing.
Figure 20B:
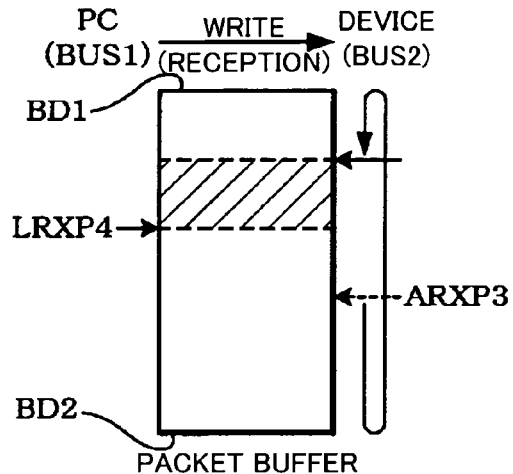

As shown in FIG. 20A, every time transfer data is read out from the packet buffer 40 to the BUS2, the pointer ARXP3 is updated and the position it indicates moves downward. The pointer ARXP3 is managed by a ring buffer method. Thus, when the pointer ATXP3 reaches the lower boundary BD2 of the store area, ATXP3 returns to the upper boundary BD1, as shown in FIG. 20B.

Figure 20C:
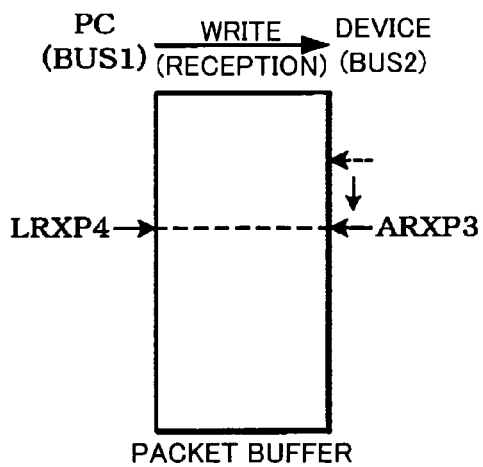

When it is determined that ARXP3=LRXP4 (step S57 of FIG. 11), all the data in the entire store area of the packet buffer 40 has been read out, as shown in FIG. 20C.

Figure 20D:
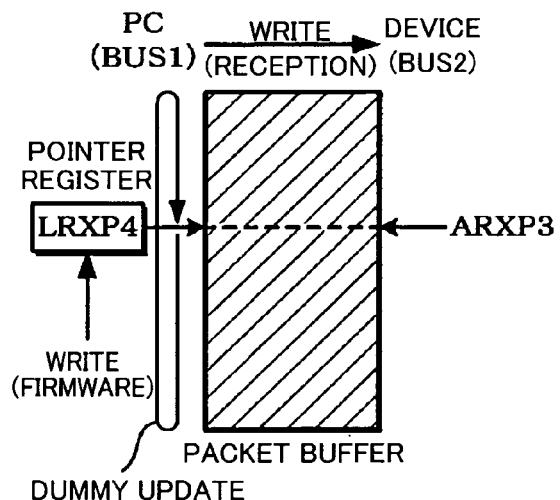
Figure 20E:
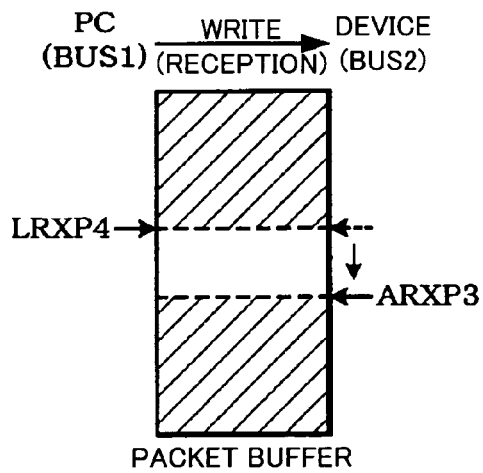

When that happens with this embodiment, the same value as LRXP4 is re-written to the LRXP4 pointer register, as shown in FIG. 20D (step S58 of FIG. 11). This performs a dummy update of the pointer LRXP4, giving a similar result as the writing of all the data in the store area. The pointer ARXP3 is updated as shown in FIG. 20E and the transfer data is read out from the store area from which a pseudo write has been performed to the BUS2. The pointer control of FIGS. 20A to 20E is repeated until the DMA transfer is complete (step S56 of FIG. 11), to transfer dummy data with respect to the BUS2.

This embodiment configured as described above succeeds in implementing dummy data transfer by performing dummy updates of LRXP4 (the fourth pointer) in such a manner that LTXP4 is not surpassed by the ATXP3 (the third pointer) that is updated every time transfer data to the BUS2 is read out.

The above-described embodiment performs pseudo transfers of dummy data through the BUS2 to the device 100 until the DMA transfer is complete, then aborts the command CMD1 after the DMA transfer is complete. The reading and writing of transfer data on the personal computer 2 side is done in a pseudo fashion by dummy updates of the pointers LTXP2 and LRXP4, as shown in FIGS. 19D and 20D. It is therefore possible to prevent any adverse effect on the processing of the personal computer 2 due to the continuing DMA transfer up until the command CMD1 is aborted. The processing of the new ORB2 (CMD2) that is sent to the personal computer 2 after the bus reset can be executed as appropriate after the CMD1 has been aborted.

Note that the method of performing dummy updates of the pointers LTXP2 and LRXP4 is not limited to that shown in FIGS. 19A to 20E, at least so long as LTXP2 and LRXP4 are controlled so as not to be overtaken by the pointers ATXP1 and ARXP3. Similarly, the dummy data transfer processing need not be done by the pointer control shown in FIGS. 19A to 20E; it could also be implemented by providing a dedicated hardware circuit for dummy data transfers.

5. ATA/ATAPI Interface Circuit

Figure 21:
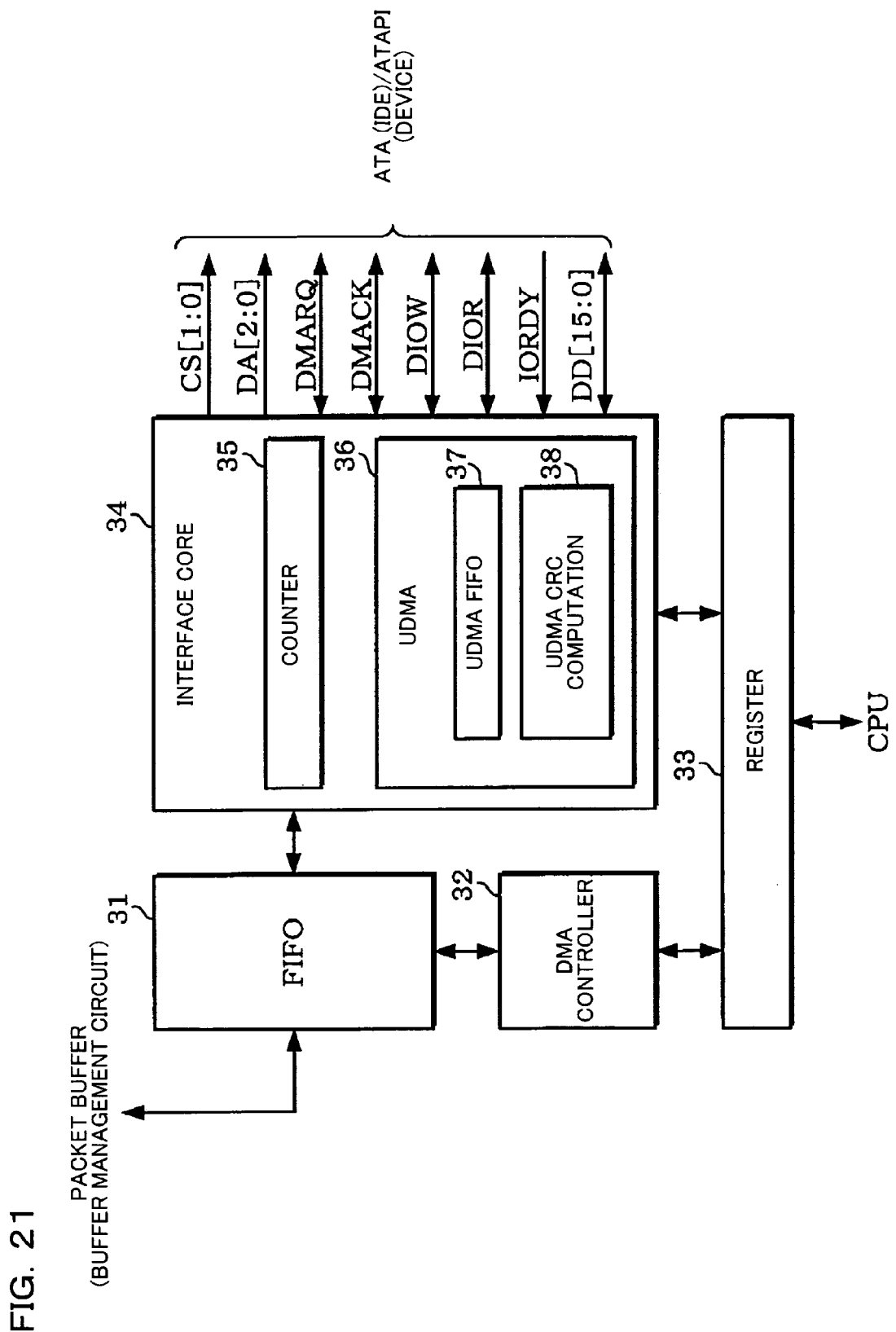
FIG. 21 shows an example of the configuration of the interface circuit.

An example of the configuration of the interface circuit 30 for ATA/ATAPI is shown in FIG. 21. Note that the interface circuit 30 need not necessarily be provided with all the circuit blocks shown in FIG. 21; some of them can be omitted.

A FIFO 31 is a buffer for adjusting (buffering) any differences in the data transfer rate. The DMA controller 32 is a circuit for controlling (by REQ/ACK control) the FIFO 31 and an interface core circuit 34.

The interface core circuit 34 is a circuit that provides DMA control. A counter 35 included by the interface core circuit 34 is a reset counter for ATA (IDE)/ATAPI. A UDMA circuit 36 included by the interface core circuit 34 is a circuit for controlling ATA/ATAPI UltraDMA transfers, and it including a FIFO 37 for UltraDMA and a CRC computation circuit 38 for UltraDMA.

A register 33 is a register for controlling the start of DMA transfer, where this register 33 can be accessed by the firmware 50 (the CPU 42).

CS[1:0] is a chip select signal used for accessing the ATA registers. DA[2:0] is an address signal for accessing data or a data port.

DMARQ and DMACK are signals used in DMA transfer. When the preparations for data transfer are complete, the device 100 side makes DMARQ active (asserts it) and, in response thereto, the data transfer control system 10 (host) side makes DMACK active at DMA transfer start.

DIOW (STOP) is a write signal used during writing to a register or data port. Note that it also functions as a STOP signal during UltraDMA transfer. DIOR (HDMARDY, HSTROBE) is a read signal used during reading from a register or data port. Note that it also functions as a HDMARDY or HSTROBE signal during UltraDMA transfer.

IORDY (DDMARDY or DSTROBE) is used as a wait signal when the preparations for data transfer for the device 100 are not complete. Note that it also functions as a DDMARDY or DSTROBE signal during UltraDMA transfer. Examples of the waveforms of the above-mentioned ATA signals are shown in FIGS. 22A to 24B. Note that "#" in these figures denotes signals of negative logic level (active when low).

FIGS. 22A and 22B show examples of signal waveforms during parallel I/O (PIO) read and write. Reading of the ATA status register is implemented by the PIO read of FIG. 22A and writing to the control register is implemented by the PIO write of FIG. 22B. A software reset for aborting a command issued by the device 100 could be done by the PIO write of FIG. 22B, to set the SRST bit of the register of the interface circuit 102 to 1, by way of example.

FIGS. 23A and 23B show examples of signal waveforms during DMA read and DMA write. Once the preparations for data transfer are complete, the device 100 (the interface circuit 102) makes DMARQ go active (high). On reception thereof, the data transfer control system 10 (the interface circuit 30) makes DMACK go active (low) to start the DMA transfer. DIOR (for read) or DIOW (for write) is subsequently used to perform DMA transfer of data DD [15:0].

Figure 24A:
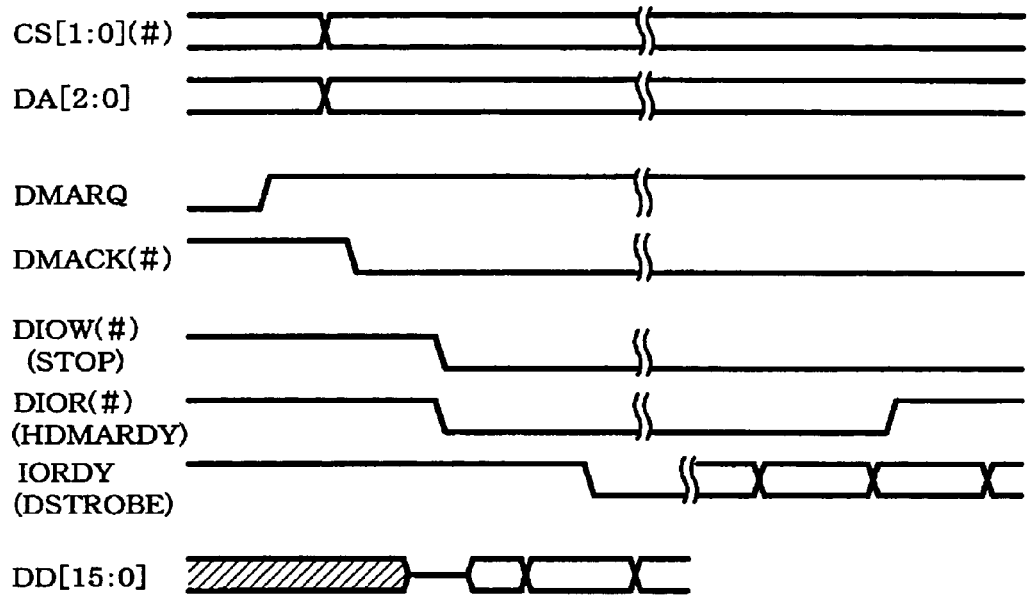
FIGS. 24A and 24B show examples of signal waveforms during UltraDMA transfer.
Figure 24B:
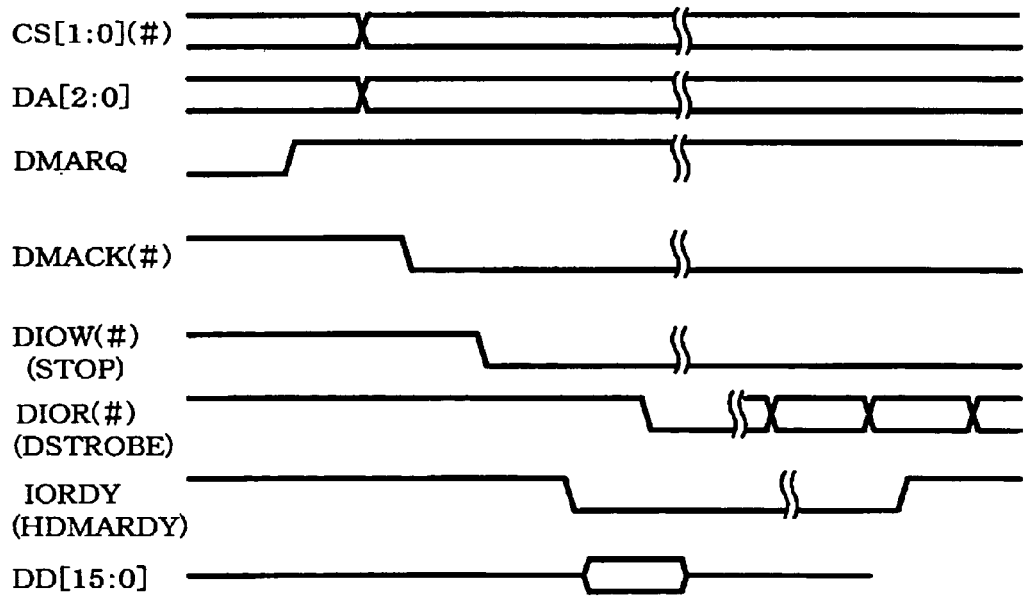

FIGS. 24A and 24B show examples of signal waveforms during UltraDMA read and UltraDMA write. Once the preparations for data transfer are complete, the device 100 makes DMARQ go active. On reception thereof, the data transfer control system 10 makes DMACK go active to start the DMA transfer. DIOW, DIOR, and IORDY are subsequently used to perform UltraDMA transfer of data DD[15:0].

Note that the present invention is not limited to this embodiment and thus various modifications thereto are possible within the scope of the invention laid out herein.

For example, terminology (such as: IEEE 1394, ATA/ATAPI, SBP-2, IPover1394, ORB, personal computer, SBP-2 circuit, hard disk drive, optical disk drive, storage device, printer device, scanner device, and CPU) that is derived from generic terminology defined within this document (such as: first interface standard, second interface standard, upper-level first protocol of a first interface standard, upper-level second protocol of the first interface standard, command packet, electronic instrument, transfer execution circuit, storage device, device, and processor) could be replaced by other terminology used within this document.

It is also possible for an aspect of the present invention that is defined by a dependent claim to omit some of the configurational requirements of the corresponding antecedent claim. Similarly, the components of the present invention defined by an independent claim can also be allocated to other independent claims.

The configurations of the data transfer control system and electronic instrument of the present invention are not limited to those shown in FIG. 7 and thus various modifications thereto are possible. For example, some of the circuit blocks and function blocks used in these figures could be omitted, or the connective relationship therebetween could be modified. For example, in addition, the connective configuration of the physical-layer circuit, the link-layer circuit, and the packet buffer is not limited to that shown in FIG. 7.

This embodiment was described as relating to a configuration in which the functions of components such as the determination section, command storage section, command comparison section, address storage section, address comparison section, transfer restart section, command processing section, command abort section were implemented by firmware (programs), but all or some of these functions could equally well be implemented by a hardware circuit.

Similarly, the present invention is particularly useful for a bus reset under IEEE 1394, but it can also be applied to any reset in which at least node topology information is cleared. The present invention can also be applied to command abort processing at times other than a bus reset.

The present invention can be applied to various electronic instruments (such as hard disk drives, optical disk drives, magneto optical disk drives, PDAs, expansion devices, audio equipment, digital video cameras, mobile phones, printers, scanners, TVs, VCRs, telephones, display devices, projectors, personal computers or electronic organizers).

In addition, this embodiment was described as relating to a configuration in which the present invention was applied to data transfer by the IEEE 1394, SBP-2, and ATA/ATAPI standards. However, the present invention can also be applied to standards based on concepts similar to those of IEEE 1394 (P1394a), SBP-2 (SBP), or ATA/ATAPI, or on standards derived from IEEE 1394, SBP-2, and ATA/ATAPI.

There can be provided embodiments of the present invention having features as follows.

A data transfer control system according to one embodiment of the present invention includes:

an address storage section which stores a first address, the first address being stored in a page table element that is being processed at a point at which a bus reset occurs among page table elements of a page table specified by a first command packet transferred through a first bus;

an address comparison section which reads out a second address and compares the stored first address and the read-out second address, the second address being stored in a page table element having the same element number as the page table element in which the first address is stored among page table elements of a page table specified by a second command packet, when the second command packet is transferred through the first bus after the bus reset occurs; and a transfer restart section which restarts data transfer from the page table element that is being processed at the point at which the bus reset occurs, when it has been determined that the first address and the second address are the same.

This embodiment ensures the storing of a first address that is stored in a page table element that is being processed at the point at which the bus reset occurred. The second address stored in the page table element having the same element number as the page table element in which the first address is stored, of the page table elements of the page table specified by the second command packet after the bus reset, is read out. Data transfer is restarted on condition that the first and second addresses are the same. This makes it possible to implement data transfer with a higher degree of reliability, by enabling the reliable restart of data transfer from the page table element that was being processed at the time of the bus reset.

With this data transfer control system, the address storage section may store a first direct address which is specified by the first command packet when a page table is absent, the address comparison section may compare the first direct address and a second direct address which is specified directly by the second command packet when a page table is absent, and the transfer restart section may restart the data transfer when it has been determined that the first direct address and the second direct address are the same.

This makes it possible to guarantee normal operation when a bus reset occurs, regardless of whether or not the page table is present.

With this data transfer control system, the address storage section may store K first addresses (where K is an integer equal to or greater than two) which are stored in K page table elements among the page table elements of the page table specified by the first command packet, the K page table elements including consecutive page table elements starting from an initial page table element to the page table element that is being processed at the point at which the bus reset occurs; the address comparison section may read out K second addresses which are stored in page table elements having the same element numbers as the page table elements in which the first addresses are stored, among the page table elements of the page table specified by the second command packet transferred in after the bus reset occurs, and may compare the stored K first addresses and the read-out K second addresses; and the transfer restart section may restart the data transfer from the page table element that is being processed at the point at which the bus reset occurs, when it has been determined that the K first addresses and K second addresses are the same.

Note that data transfer restart processing could also be performed by doing a comparison of part of the page table elements of the page table elements from the initial page table element to the page table element that was being processed, before and after the bus reset.

A data transfer control system according to another embodiment of the present invention includes:

a command storage section which stores a content of a first command packet transferred through a first bus;

an address storage section which stores a first direct address which is specified directly by the first command packet, when a page table is absent;

a command comparison section which compares a content of the first command packet and a content of a second command packet, when the second command packet is transferred through the first bus after a bus reset occurs;

an address comparison section which compares a first direct address which is specified directly by the first command packet and a second direct address which is specified directly by the second command packet, when the page table is absent; and a transfer restart section which restarts data transfer as a resumption of data transfer at a point at which the bus reset occurs on condition that it has been determined that the contents of the first and second command packets are the same and also that the first and second direct addresses are the same when the page table is absent, and restarts data transfer as a resumption of data transfer at the point at which the bus reset occurred on condition that it has been determined that the contents of the first and second command packets are the same when the page table is present.

This embodiment ensures that data transfer restart processing is performed when the page table is absent, if the contents of the first and second command packets are the same and also the first and second direct addresses are the same. When the page table is present, on the other hand, data transfer restart processing is performed if the contents of the first and second command packets are the same. This makes it possible to reduce the processing load, by enabling omission of the comparison processing performed on addresses stored in the page table elements when the page table is present. Since the data transfer restart processing is performed on condition that the contents of the first and second command packets are the same, it is possible to restart the data transfer appropriately from the data transfer that was being performed when the bus reset occurred.

Any of the above data transfer systems may further includes:

a command processing section which receives a command packet transferred through the first bus, issues a command indicated by the command packet to a device connected to a second bus, and instructs a start of DMA transfer through the second bus; and a command abort section which aborts the command issued to the device connected to the second bus based on the first command packet, after DMA transfer started based on the first command packet has been completed, when data transfer is not be restarted by the transfer restart section.

With this feature, the command indicated by the command packet that was transferred from the first bus is issued with respect to the device that is connected to the second bus, to instruct the start of DMA transfer. The command issued to the device connected to the second bus is aborted (halted or canceled) after the DMA transfer is complete. This makes it possible to prevent a situation that the device connected to the second bus is made to hang up by the incorrect ending of the DMA transfer, enabling a suitable abort of the command issued for that device. Note that the first bus is a bus for data transfer in accordance with a first interface standard whereas the second bus is a bus for data transfer in accordance with a second interface standard.

With any of the above data transfer control systems, the command abort section may control dummy data transfer to or from the device connected to the second bus until the DMA transfer is complete.

The dummy data transfer control in this case could be implemented by dummy updates of the pointers of the packet buffer in which the transfer data is temporarily stored, or by the provision of hardware for dummy data transfer. In addition, the dummy data is a data transferred through the second bus but is not transferred through the first bus, by way of example.

With any of the above data transfer control systems, the command abort section may abort the command without controlling the dummy data transfer, in a case that DMA transfer is not operating when it is determined whether or not the command is to be aborted.

This makes it possible to omit the dummy data transfer control, thus making the processing more efficient.

Any of the above data transfer control system may further includes:

a pointer management section which manages pointers of a packet buffer that temporarily stores transfer data, by a ring buffer method, updates a first pointer every time transfer data from the second bus is written to the packet buffer, and updates a second pointer every time transfer data to the first bus is read out from the packet buffer, and the command abort section may control the dummy data transfer by performing a dummy update of the second pointer in such a manner that the second pointer is not overtaken by the first pointer that is updated every time transfer data from the second bus is written to the packet-buffer.

Any of the above data transfer control system may further includes:

a pointer management section which manages pointers of a packet buffer that temporarily stores transfer data, by a ring buffer method, updates a third pointer every time transfer data to the second bus is read out from the packet buffer, and updates a fourth pointer every time transfer data from the first bus is written to the packet buffer, and the command abort section may control the dummy data transfer by performing a dummy update of the fourth pointer in such a manner that the fourth pointer is not overtaken by the third pointer that is updated every time transfer data to the second bus is read out from the packet buffer.

With any of the above data transfer control system, the first bus may be a bus in which data transfer is performed by the IEEE 1394 standard.

An electronic instrument according to a further embodiment of the present invention includes any one of the above data transfer control systems and a device connected to a second bus of the data transfer control system.

What is claimed is:

1. A data transfer control system for data transfer through a first bus, the data transfer control system comprising:
   an address storage section which stores a first address and a first element number, the first address being stored in a first page table element that is being processed at a point at which a bus reset occurs among page table elements of a page table specified by a first command packet transferred through the first bus, the first element number being an element number of the first page table element:
   an address read section which reads out a second address based on the first element number, the second address being stored in a second page table element among page table elements of a page table specified by a second command packet, the second page element having the same element number as the first element number, the second command packet being transferred through the first bus after the bus reset occurs;
   an address comparison section which compares the first address and the second address; and
   a transfer restart section which restarts data transfer from the page table element that is being processed at the point at which the bus reset occurs, when it has been determined that the first address and the second address are the same.

2. The data transfer control system as defined by claim 1,
   the address storage section storing a first direct address which is specified by the first command packet when a page table is absent,
   the address comparison section comparing the first direct address and a second direct address which is specified directly by the second command packet when a page table is absent, and
   the transfer restart section restarting the data transfer when it has been determined that the first direct address and the second direct address are the same.

3. The data transfer control system as defined by claim 1,
the address storage section storing K first addresses (where K is an integer equal to or greater than two) which are stored in K first page table elements among the page table elements of the page table specified by the first command packet, the K first page table elements including consecutive page table elements starting from an initial page table element to the first page table element that is being processed at the point at which the bus reset occurs,
the address read section reading out K second addresses which are stored in K second page table elements among the page table elements of the page table specified by the second command packet, the K second page table elements including consecutive page table elements starting from an initial page table element to the second page table element having the same element number as the first element number,
the address comparison section comparing the K first addresses and K second addresses, and
the transfer restart section restarting the data transfer from the page table element that is being processed at the point at which the bus reset occurs, when it has been determined that the K first addresses and K second addresses are the same.

4. The data transfer control system as defined by claim 1, further comprising:
a command processing section which receives a command packet transferred through the first bus, issues a command indicated by the command packet to a device connected to a second bus, and instructs a start of DMA transfer through the second bus; and
a command abort section which aborts the command issued to the device connected to the second bus based on the first command packet, after DMA transfer started based on the first command packet has been completed, when data transfer is not be restarted by the transfer restart section.

5. The data transfer control system as defined by claim 4,
the command abort section controlling dummy data transfer to or from the device connected to the second bus until the DMA transfer is complete.

6. The data transfer control system as defined by claim 5,
the command abort section aborting the command without controlling the dummy data transfer, in a case that DMA transfer is not operating when it is determined whether or not the command is to be aborted.

7. The data transfer control system as defined by claim 5, further comprising:
a pointer management section which manages pointers of a packet buffer that temporarily stores transfer data, by a ring buffer method, updates a first pointer every time transfer data from the second bus is written to the packet buffer, and updates a second pointer every time transfer data to the first bus is read out from the packet buffer,
the command abort section controlling the dummy data transfer by performing a dummy update of the second pointer in such a manner that the second pointer is not overtaken by the first pointer that is updated every time transfer data from the second bus is written to the packet buffer.

8. The data transfer control system as defined by claim 5, further comprising:
a pointer management section which manages pointers of a packet buffer that temporarily stores transfer data, by a ring buffer method, updates a third pointer every time transfer data to the second bus is read out from the packet buffer, and updates a fourth pointer every time transfer data from the first bus is written to the packet buffer,
the command abort section controlling the dummy data transfer by performing a dummy update of the fourth pointer in such a manner that the fourth pointer is not overtaken by the third pointer that is updated every time transfer data to the second bus is read out from the packet buffer.

9. The data transfer control system as defined by claim 1,
the first bus being a bus in which data transfer is performed by the IEEE 1394 standard.

10. An electronic instrument comprising:
the data transfer control system as defined in claim 1; and
a device connected to a second bus of the data transfer control system.

11. A data transfer control method for performing data transfer through a first bus, the method comprising:
storing a first address and a first element number, the first address being stored in a first page table element that is being processed at a point at which a bus reset occurs among page table elements of a page table specified by a first command packet transferred through the first bus, the first element number being an element number of the first page table element;
reading out a second address based on the first element number, the second address being stored in a second page table element among page table elements of a page table specified by a second command packet, the second page element having the same element number as the first element number, the second command packet being transferred through the first bus after the bus reset occurs;
comparing the first address and the second address, and
restarting data transfer from the page table element that is being processed at the point at which the bus reset occurs, when it has been determined that the first address and the second address are the same.

* * * * *